US012791331B1

(12) United States Patent
Tran et al.

(10) Patent No.: US 12,791,331 B1
(45) Date of Patent: Nov. 10, 2026

(54) ACCESS POINT DETECTION OF A BUILDING

(71) Applicant: GM Cruise Holdings LLC, San Francisco, CA (US)

(72) Inventors: David Tran, El Granada, CA (US); Cheuk-Hung Ng, San Francisco, CA (US); Willie Lewis, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 182 days.

(21) Appl. No.: 18/403,463

(22) Filed: Jan. 3, 2024

(51) Int. Cl.
*G01C 21/34* (2006.01)
*G01C 21/36* (2006.01)

(52) U.S. Cl.
CPC ..... *G01C 21/3461* (2013.01); *G01C 21/3614* (2013.01)

(58) Field of Classification Search
None
See application file for complete search history.

(56) References Cited

U.S. PATENT DOCUMENTS 11,222,299 B1 * 1/2022 Baalke ................. G01C 21/206
11,493,345 B1 * 11/2022 Williams .............. B64C 39/024
11,763,408 B2 9/2023 Stumpf et al.
11,995,599 B1 * 5/2024 Baalke ................. G01C 21/206
12,077,188 B2 * 9/2024 Pandit ............... B60W 60/0025
2019/0295421 A1 9/2019 Bavar et al.
2020/0192382 A1 6/2020 Pandit et al.
2020/0410406 A1 * 12/2020 Leary .................. B60N 2/0026
2021/0132625 A1 * 5/2021 Gillett .................... B25J 11/008
2022/0349720 A1 * 11/2022 Gao ....................... G06Q 10/02

OTHER PUBLICATIONS

Uber. (Jul. 20, 2019). What are suggested pickup locations?. Uber. (Year: 2019).*

Gulzar, M., Muhammad, Y., & Muhammad, N. (2021). A survey on motion prediction of pedestrians and vehicles for autonomous driving. IEEE Access, 9, 137957-137969. (Year: 2021).*

* cited by examiner

*Primary Examiner* — Hitesh Patel
*Assistant Examiner* — Tabitha Kress
(74) *Attorney, Agent, or Firm* — Honigman LLP; Matthew H. Szalach

(57) ABSTRACT

Systems, methods, and non-transitory computer readable mediums are provided for identifying one or more access point points of one or more buildings and determining one or more service locations for each of the one or more access points. For example, a system may obtain sensor data of one or more autonomous vehicles (AV). Additionally, the system may identify a building based on the sensor data. Moreover, the system may identify a set of access points of the building based on sensor data associated with the building. Further, the system may generate service location data, the service location data identifying, for each of the set of access points, a drop-off or pick-up location. Additionally, the system may transmit one or more portions of the service location data to a service application executed by a computing device operated by a user.

20 Claims, 10 Drawing Sheets

ACCESS POINT DETECTION OF A BUILDING

BACKGROUND

1. Technical Field

The present disclosure generally relates to object detection in sensor data and, more specifically, access point detection of one or more buildings.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Additionally, data generated by the sensors may be utilized to identify and determine one or more objects in an environment around the AV.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Figure 1:
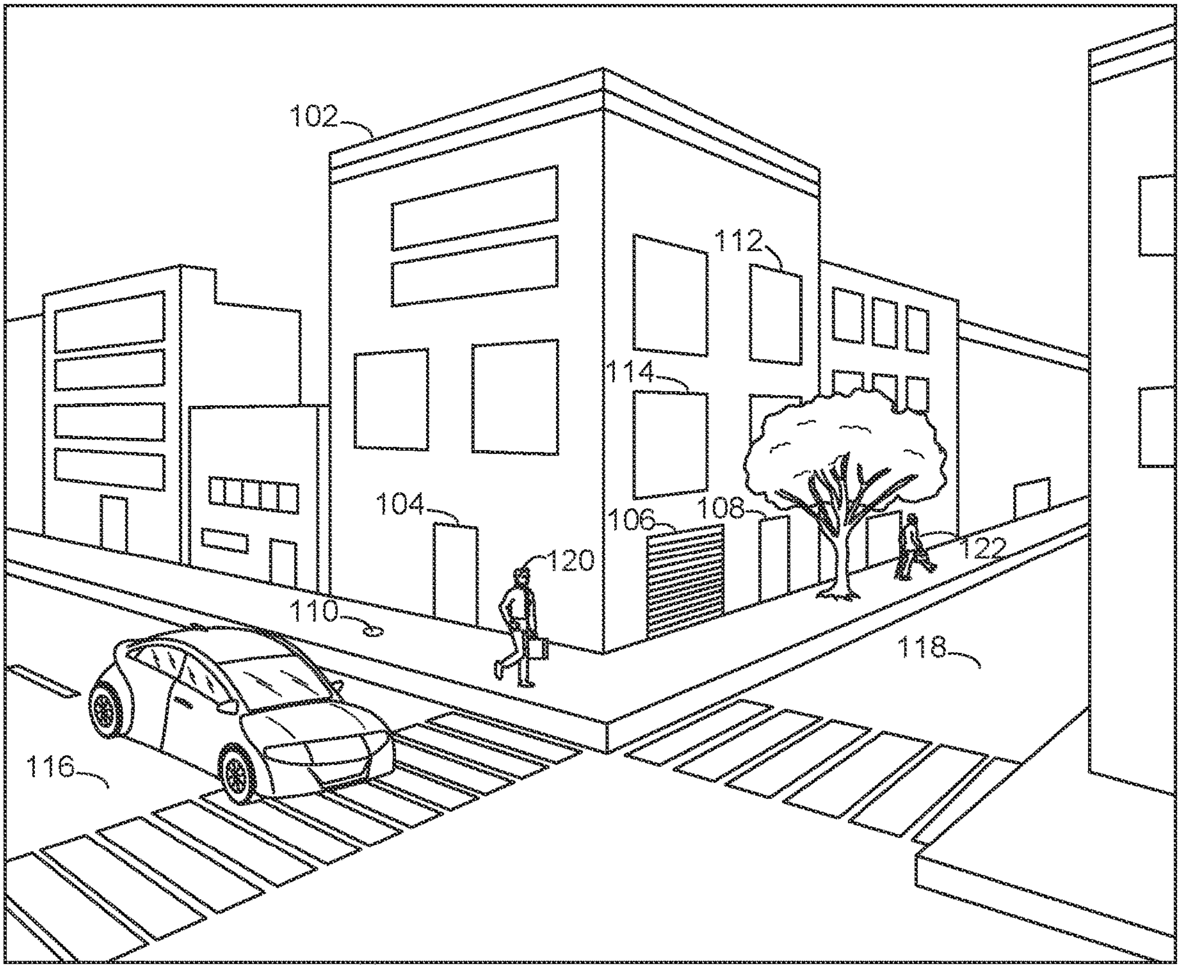
FIG. 1 illustrates an example environment that an autonomous vehicle (AV) may be in, according to some examples of the present disclosure.

In some examples, for each building identified as a pick-up or drop-off location in corresponding ride requests, a ride-share computing system may automatically identify a particular location (herein described as a "service location") to route a vehicle managed by the ride-share computing system to. In such examples, the building may include multiple access points (e.g., entryway, exit, door, loading dock, gates, etc.) and the service locations may generally be associated with the main access point of the building. The main access point may be the access point that most people, such as employees, residents or visitors, may use to access the building. Additionally, the main access point may be designated by an entity managing the building, such as an owner or landlord of the building. However, the main access point and associated service location may not be the most convenient location for an associated user. For instance, as illustrated in FIG. 1, building 102 may be identified as a pick-up location for a ride request of a user. Additionally, building 102 may include multiple access points, such as access point 104, access point 106 and access point 108, and access point 104 may be the main access point. Moreover, a ride-share computing system may automatically identify service location 110 for the ride request for the user. However, the user's current location may be in office 112 and the path between office 112, access point 104 and service location 110 may be distant and cumbersome for the user. In fact, building 102 has a second access point, access point 108 that may be closer to office 112 compared to access point 104. As such, for the user, a service location associated with access point 108 may be more convenient, shorter and less cumbersome than service location 110 of access point 104.

Aspects of the disclosed technology provide solutions for identifying pick-up or drop-off locations on a building-by-building basis. In some examples, the building may include multiple access points. As described herein, a computing system may utilize map data, user input and/or sensor data of one or a fleet of autonomous vehicles and data derived from such sensor data to more accurately identify access points of buildings that the one or fleet of autonomous vehicles encounter. Examples of the one or more sensors include a camera sensor, a Light sensor (e.g., light detection and ranging systems, ambient light sensors, infrared sensors, etc.), RADAR systems, audio sensors, and location based sensors (e.g., GPS systems). In some instances, executed sensor engine 234 may utilize one or more trained artificial intelligence or machine learning (AI/ML) processes to identify one or more objects within the sensor data. Additionally, the computing system may determine one or more service locations for each of the access points identified for each building the one or fleet of autonomous vehicles encounter. Further, the computing system may present information pertaining to the access points and/or the one or more service locations of each of the access points to users of the computing system. As such, the computing system may more intelligently route an autonomous vehicle to a service location that may be more convenient (e.g., closer) to the user compared to other ride-share computing systems.

Figure 2:
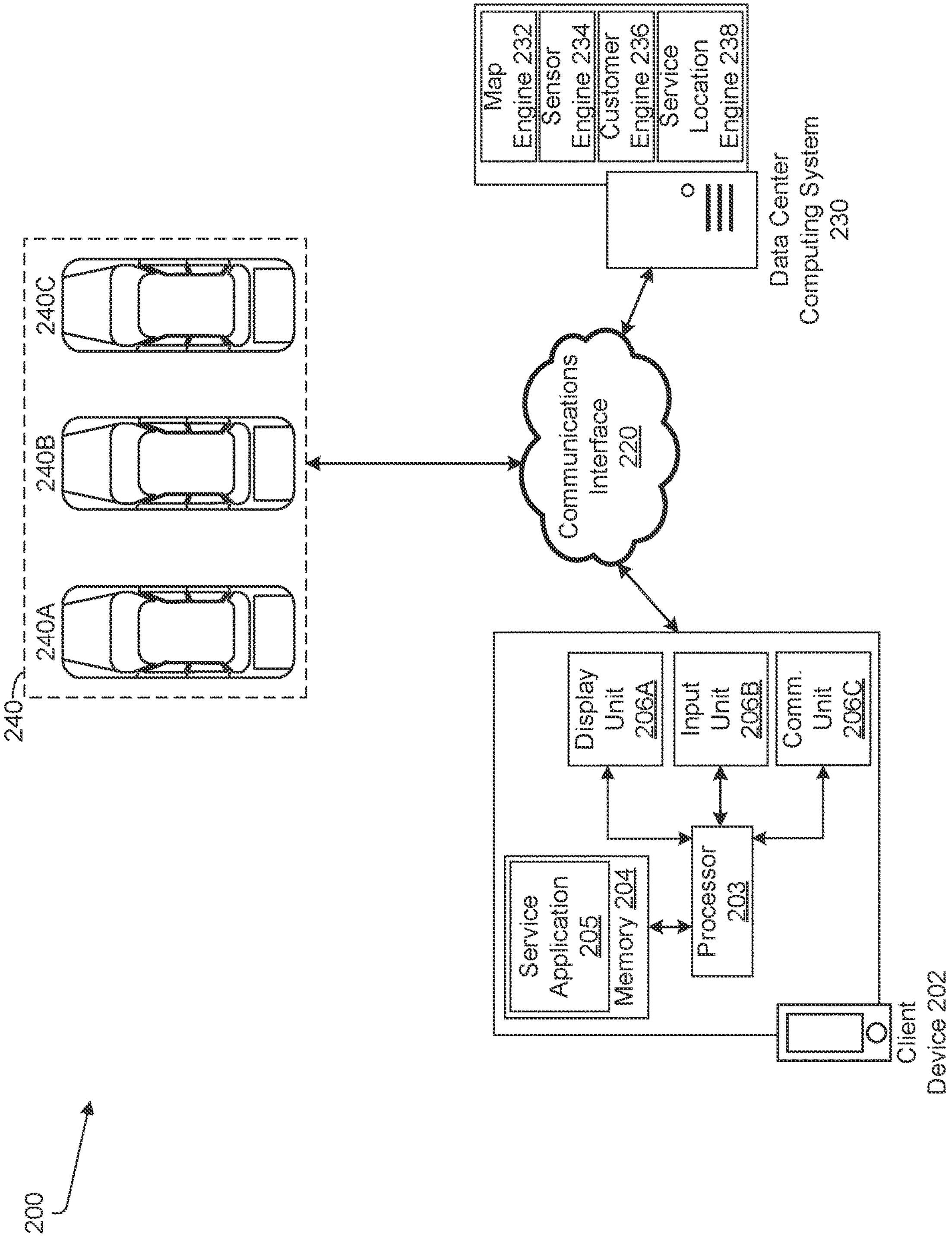
FIG. 2 illustrates a diagram of an exemplary computing environment, according to some examples of the present disclosure.

FIG. 2 is a diagram illustrating an example computing environment 200, consistent with certain disclosed embodiments. As illustrated in FIG. 2, computing environment 200 may include one or more client devices, such as client device 202, one or more computing systems, such as data center computing system 230, and one or more autonomous vehicles (AVs) 240 that are managed by data center computing system 230. The one or more client devices, the one or more computing systems, and the one or more autonomous vehicles may be interconnected through any appropriate combination of communications networks, such as communications network 220.

Examples of communications network 220 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems operating within computing environment 100 may perform operations that establish and maintain one or more secure channels of communication across communications network 220, such as, but not limited to, a transport layer security (TSL) channel, a secure socket layer (SSL) channel, or any other suitable secure communication channel.

As described herein, data center computing system 230 may perform any of the exemplary processes described herein, to among other things, determine one or more access points for a building. Additionally, data center computing system 230 may perform any of the exemplary processes described herein, to among other things, support and manage a ride-hailing service, including managing and routing one or a fleet of autonomous vehicles (AVs) 240 for the ride-hailing service. For instance, a service application, such as service application 205 may generate a ride request based on one or more user provided inputs. Additionally, the ride request may include one or more service locations associated with the one or more access points. Moreover, the service application may transmit, over one or more communication networks, such as communications network 220, the ride request to data center computing system 230. Further, data center computing system 230 may initiate a ride-share service (e.g., routing one of the AVs 240, such as AV 240A to the service location) in accordance with the ride request.

Moreover, data center computing system 230 may correspond to a computing system that includes one or more servers and tangible, non-transitory memory devices storing executable code and application modules. The servers may, for example, each include one or more processor-based computing devices, which may be configured to execute portions of the stored code or application modules to perform operations consistent with the disclosed embodiments. In some instances, and consistent with the disclosed embodiments, data center computing system 230 may correspond to a distributed system that includes computing components distributed across one or more networks, such as communications network 220, or other networks, such as those provided or maintained by cloud-service providers.

Referring to FIG. 2, at least one processor of data center computing system 230 may execute map engine 232, sensor engine 234 and/or customer engine 236 to determine and/or verify one or more access points for a building. In some examples, executed map engine 232 may perform any of the exemplary processes described herein, to among other things, determine one or more access points for a building based on map data. In such examples, executed map engine 232 may obtain, from a third party computing system, the map data.

As described herein, the map data may include a set of data points that are a diagrammatic representation of geographic areas that one or more autonomous vehicles (AVs) may travel in, such as AVs 240. In some instances, the set of data points are in a three-dimensional coordinate system. Additionally, each data point of the set of data points may represent a single spatial measurement on the surface of an object in the geographic areas, such as a building. Further, the map data may characterize multiple layers, such as an areas layer, a lanes and boundaries layer, an intersections layer, a traffic controls layer, object layer and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

Additionally, the map data may include an object layer. The object layer may identify, and label one or more parts of each object identified in the geographic areas of the map data. For instance, for a building, the corresponding object layer may identify one or more parts of the building, such as portions of the building which are an access point, window, awning, etc. In such an instance, the object layer may indicate one or more attributes or characteristics of each of the parts of the object, such as for an access point which includes a ramp or is an accessible access point. Moreover, executed map engine 232 may determine or identify one or more buildings within the geographic areas of the map data based on the map data. Further, executed map engine 232 may identify one or more access points for each of the one or more buildings, based on portions of the object layer corresponding to each of the one or more buildings. As described herein, portions of the map data corresponding to each of the one or more access points may include location information, such as geographical coordinates associated with the corresponding access point.

In other examples, executed sensor engine 234 may perform any of the exemplary processes described herein, to among other things, determine one or more access points for a building based on sensor data. In such examples, executed sensor engine 234 may obtain sensor data from one or more sensors of one or more autonomous vehicles (AVs) 240, such as AV 240A, AV 240B, and 240C. Additionally, executed sensor engine 234 may determine the one or more access points for a building based on one or more portions of the sensor data. As described herein, the sensor data may correspond to or is associated with one or more objects that the one or more AVs 240 encounters, such as buildings. Examples of the one or more sensors include a camera sensor, audio sensor, a Light sensor (e.g., light detection and ranging systems, ambient light sensors, infrared sensors, etc.), RADAR systems, and location based sensors (e.g., GPS systems). Further, executed sensor engine 234 may utilize one or more trained artificial intelligence or machine learning (AI/ML) processes to identify one or more objects within the sensor data.

In some instances, the sensor data, such as sensor data generated by a LIDAR system of one or more AVs 240, could include a set of data points that each represent a single spatial measurement on the surface of one or more objects that one or more AVs 240 passed by or encountered, such as a building. In such examples, executed sensor engine 234 may obtain an AI/ML dataset that includes one or more parameters of a trained AI/ML process associated with object detection within the sensor data. Additionally, based on the AI/ML dataset, executed sensor engine 234 may apply the trained AI/ML process to the sensor data. Based on the application of the trained AI/ML process to the sensor data, executed sensor engine 234 may identify one or more objects and determine which of the one or more objects is a building based on one or more portions of sensor data of each of the one or more objects. Moreover, based on the application of the trained AI/ML process to the sensor data, executed sensor engine 234 may identify one or more access points of each object identified as a building based on corresponding one or more portions of the sensor data. Further, the one or more portions of the sensor data of each of the one or more identified access points may include location information, such as geographical coordinates associated with the corresponding access point.

In other instances, executed sensor engine 234 may determine one or more objects of a building may be an access point by comparing corresponding sets of data points of sensor data corresponding to the one or more access points. For instance, executed sensor engine 234 may obtain sensor data. The sensor data may include a set of data points associated with an object and each of the sets of data points may be generated at different time intervals by one or more sensors of one or more AVs 240. Additionally, executed sensor engine 234 may apply a trained AI/ML process associated with object detection to the sensor data, as described herein. Moreover, based on the application of the trained AI/MWL process to the sensor data, executed sensor engine 234 may identify an object for a building. Further, executed sensor engine 234 may obtain sets of data points associated with the object. Based on the sets of data points, executed sensor engine 234 may compare the sets of data points corresponding to the object. Executed sensor engine 234 may determine the object is an access point based on the comparison indicating there is a change between the sets of data points. Otherwise, executed sensor engine 234 may determine the object is not an access point.

In another instance, executed sensor engine 234 may determine one or more objects of a building is an access point based on motion characteristics of the one or more objects. For example, based on an application of a trained AI/ML process associated with object detection to a first portion of the sensor data, such as LIDAR data, executed sensor engine 234 may identify an object of a building. Additionally, executed sensor engine 234 may obtain a second portion of the sensor data, such as RADAR data, associated with the first portion of the sensor data. The second portion of the sensor data, such as RADAR data, may indicate and characterize the kinematic or motion characteristics associated with an access point candidate, such as the door candidate. Examples of kinematic or motion characteristics associated with the access point candidate, such as the door candidate, may include motions associated with a sliding door, a pivoted door, and a roll up door. As such, executed sensor engine 234 may determine a motion characteristic associated with the object. For instance, whether the corresponding RADAR data indicates the object has moved at any point in time when the one or more AVs 240 drove by the access point candidate. Based on the determined motion characteristic associated with the object, executed sensor engine 234 may determine whether the object is an access point. For instance, following the example above, executed sensor engine 234 may determine the object is an access point, such as a door, based on determining the corresponding RADAR data indicating the object moved during a time interval when one or more AVs 240 passed by the candidate door. Alternatively, executed sensor engine 234 may determine the object is not an access point based on determining the corresponding RADAR data indicating the object did not move during any time interval the one or more AVs drove past the door candidate.

In yet another instance, executed sensor engine 234 may utilize sensor data of other objects to determine whether an object of a building is an access point. For example, based on an application of a trained AI/ML process associated with object detection to the sensor data, executed sensor engine 234 may identify a first object of a building and a number of other objects that are near the door candidate (e.g., within a proximity distance threshold of first object). Additionally, executed sensor engine 234 may obtain, from the sensor data, sets of data points associated with each of the number of other objects and the first object. Each of the sets of data points may be generated by one or more sensors of one or more AVs 240 at different time intervals. Further, executed sensor engine 234 may compare, for each of the number of identified other objects, the sets of data points with respect to the sets of data points associated with the first object. Executed sensor engine 234 may determine the first object is an access point based on the comparison indicating the one or more of the number of identified other objects disappears or disappears into the first object.

In various examples, executed customer engine 236 may perform any of the example processes described herein, to among other things, confirm or verify one or more access point candidates for a building based on feedback or input from users of the ride-share service supported and managed by data center computing system 230. In such examples, executed customer engine 236 may receive user input data from client device 202. The user input data may include information that may indicate a verification of each of the one or more access points of a particular building. Further, executed customer engine 236 may provide an application message to a service application, such as service application 205, executing on one or more client devices. The service application may generate a graphical user interface (GUI) that presents information of each of one or more access points and includes one or more interface elements that enables a user of the one or more client devices to confirm or verify each of the one or more access points presented by the GUI.

In some instances, service application 205 may be supported by a data center computing system 230 and enable a user operating client device 202 to initiate a ride request for a ride-hailing service supported and managed by data center computing system 230. For instance, the user may utilize service application 205 to generate a ride request that includes location information of one or more locations (e.g., a pick-up location, a drop-off location and/or a delivery location). In such an instance, upon execution by the one or more processors of client device 202, service application 205 may generate a graphical user interface (GUI) and the GUI may be presented on display unit 206A. The GUI may include a window or pane that may include one or more interface elements that enable the user to provide one or more inputs corresponding to the location information of one or more locations for the ride request, via input unit 206B. Additionally, service application 205 may generate user input data characterizing the one or more inputs (e.g., the ride questing including the location information) and may provide the user input data to executed customer engine 236 provide data of one or more user inputs, such as the ride request, to executed customer engine 236. Data center computing system 230 may perform any of the example processes described herein, to among other things, initiate a ride service for the user of client device 202 based on the ride request.

As described herein, executed map engine 232, and executed sensor engine 234, may each independently determine or identify one or more access points of one or more buildings. Additionally, the one or more access points identified by executed map engine 232 may be verified or confirmed by the one or more access points identified by executed sensor engine 234 and vice versa. Additionally, or alternatively, the user input data received by executed customer engine 236 may be utilized to verify and confirm the one or more access points identified by executed map engine 232 and/or executed sensor engine 234. In some instances, the one or more access points identified by executed map engine 232 may be supplemented by the one or more access points identified by executed sensor engine 234 and vice versa. Additionally, or alternatively, the user input data received by executed customer engine 236 may be utilized to supplement the one or more access points identified by executed map engine 232 and/or executed sensor engine 234.

Referring back to FIG. 2, at least one processor of data center computing system 230 may execute service location engine 238. Executed service location engine 238 may perform any of the example processes described herein, to among other things, determine one or more service locations, such as a pick-up location, a drop-off location or delivery location, for each of the one or more access points. Additionally, executed service location engine 238 may utilize map data received from the third party computing system to determine the one or more service locations. For instance, based on information associated with each of the one or more access points, such as corresponding portions of sensor data and/or the map data, executed service location engine 238 may identify in the map data the one or more service locations associated with each of the one or more access points. Further, executed service location engine 238 may associate the identified one or more service locations to the corresponding access point.

In some examples, executed service location engine 238 may determine or identify a service location for an access point based on one or more service location criteria. In some instances, the one or more service location criteria may include a service location criterion associated with a predetermined distance threshold. In such instances, the predetermined distance threshold may characterize or describe a maximum distance between the access point and the service location. As such, executed service location engine 238 may identify the service location for the access point that satisfies predetermined distance threshold. For instance, an access point of a building may face Main Street. As such, executed service location engine 238 may identify a service location for the access point that is within 6 feet from the access point.

In some examples, executed customer engine 236 may provide access point recommendations to users of the ride-share service that data center computing system 230 manages and supports. Additionally, based on one or more inputs the user provides, an access point included in the access point recommendation, and corresponding service location, may be utilized in generating a ride request. Data center computing system 230 may utilize the ride request of the user to initiate a ride-share service for the user.

In some instances, the access point recommendations may be based on the location of a user. In such instances, the location may be associated with a building. Additionally, executed customer engine 236 may determine one or more access points that are closest or within a predetermined threshold distance to the location of the user, based on the map data, location information of each of the access points, and the location of the user. Moreover, executed customer engine 236 may obtain corresponding portions of sensor data associated with each of the one or more access points and identify information of each of the one or more access points based on the corresponding portions of sensor data (e.g., identifying information of the access point, and/or a description or image of the access point), location information of the corresponding access point (e.g., geographical coordinates), attribute information of the corresponding access point (e.g., information that identifies and characterizes one or more attributes of parts of the access point, such as a ramp, awning, etc.), identifying information of the building (e.g., a description or image), and location information of the associated building (e.g., geographical coordinates)). Further, executed customer engine 236 may obtain information of a service location associated with each of the one or more access points. Executed customer engine 236, may perform the example process as described herein to cause service application 205 to generate an access point recommendation that includes information of the one or more access point and corresponding service location.

In other instances, the access point recommendations may be based on environmental conditions associated with a building. For instance, the environmental conditions may include weather conditions. Additionally, executed customer engine 236 may identify one or more access points for the access point recommendations based on the environmental conditions. For instance, executed customer engine 236 may obtain weather data indicating that an area including a building associated with a location of a user is experiencing rain. Additionally, executed customer engine 236 may obtain portions of sensor data corresponding to each access point of the building. The portions of sensor data of each access point may identify and characterize parts of the corresponding access point, such as whether the access point includes a part that may cover individuals from the elements, such as an awning. Based on the portions of sensor data of each access point of the building, executed customer engine 236 may determine whether any of the access points of the building includes a part that may cover individuals from the elements. Moreover, executed customer engine 236 may obtain, from a corresponding portion of sensor data, information of each of access point that includes the part that may cover individuals from elements (e.g., identifying information of the access point (e.g., a description or image), location information of the corresponding access point (e.g., geographical coordinates), attribute information of the corresponding access point (e.g., information that identifies and characterizes one or more attributes of parts of the access point, such as a ramp, awning, etc.), identifying information of the building (e.g., a description or image), and location information of the associated building (e.g., geographical coordinates)). Further, executed customer engine 236 may obtain information of a service location associated with each of the one or more access points. Executed customer engine 236, may perform the example process as described herein to cause service application 205 to generate an access point recommendation that includes information of the access point that includes the part that may cover individuals from elements and corresponding service location.

In another instance, the environmental conditions may be associated with pedestrian/user/vehicle traffic. In such instances, executed customer engine 236 may identify, for a building with multiple access points, one or more access points that have low levels of pedestrian, user, or even vehicle traffic. Moreover, executed customer engine 236 may obtain, from a corresponding portion of sensor data, information of each access point that has low levels of pedestrian, user, and/or vehicle traffic, as described herein. Further, executed customer engine 236 may obtain information of a service location associated with each of the one or more access points. Executed customer engine 236, may perform the example process as described herein to cause service application 205 to generate an access point recommendation that includes information of the one or more access point and corresponding service location.

In yet another instance, the environmental conditions may be associated with road attributes. In such an instance, the road attributes may identify and characterize one or more attributes of streets associated with access points, such as the width of the street. Additionally, executed customer engine 236 may identify, for a building with multiple access points, one or more access points based on the road attributes of one or more streets surrounding the building. For instance, and as illustrated in FIG. 1, executed map engine 232 and/or executed sensor engine 234 determine object 104 and object 108 are both access points. Additionally, executed customer engine 346 may select object 104 over object 108 for the access point recommendation because street 118 is narrow and an AV, such as AV 240C, may block traffic if waiting for a user in building 102.

In various examples, the access point recommendations may be based on profile data. As described herein, data center computing system 230 may include an account database. The account database may store account data. The account data may identify and characterize one or more account profiles of users of the ride-share service that data center computing system 230 supports and manages. Each of the one or more account profiles may include information identifying the user (e.g., a name of the user, account number, image of the user, an identifier of a device the user is operating, etc.), one or more preferences (e.g., whether or not the user requires additional assistance), and historical information (e.g., information characterizing one or more previously generated and submitted ride requests, such as access points and service locations used).

In some instances, the access point recommendations for a user may be based on information included in an account profile of the user. In such instances, the information may indicate a preferred access point for a building with multiple access points. As described herein, an account profile for a user may include one or more preferences. Additionally, the one or more preferences may indicate access points of buildings and associated service locations that are preferred. In some instances, such preference may be based on one or more inputs the user provided. In other instances, such preference may be based on historical information included in the account profile of the user. In such instances, executed customer engine 236 may access the historical information and determine the number of times each access point of a particular building has been used for generating, creating or updating a ride request. Additionally, executed customer engine 236 may determine a particular access point of the building is a preferred access point when the determined number of times the user has selected an access point of the particular building is equal to or more than a predetermined threshold value. In other instances, a user may provide one or more inputs that indicate a particular access point of a building is the preferred access point. Additionally, in instances where executed customer engine 236 is identifying one or more access points of the building to recommend, executed customer engine 236 may select an access point to include in the access point recommendation based on the indicated preferred access point.

In other instances, the access point recommendations for a user may be based on information included in account profiles of other users. In such instances, executed customer engine 236 may obtain from account database 340, historical information of other users. The historical information of other users may indicate access points and corresponding service locations that the other users selected for their previous ride requests. Moreover, executed customer engine 236 may determine, for the building, a global preferred access point for the building, based on the historical information of the other users. As described herein, the global preferred access point is an access point that the other users selected in the generation, creation and updating of their respective ride requests. Additionally, the global preferred access point may indicate the access point that was determined as selected a number of times in the generation, creation and updating of ride requests of other users is greater than a predetermined threshold value. Executed customer engine 236 may determine, for a particular building, an access point for an access point recommendation based on the global preferred access point.

In various instances, the access point recommendations for a user may be based on one or more preferences of the users. For instance, the one or more preferences may indicate that a user may need additional assistance. Further, executed customer engine 236 may, for an access point recommendation, identify one or more access points of the building that may satisfy the one or more preferences of the users. For instance, based on the preference of the user indicating the user may need additional assistance, executed customer engine 236 may identify an access point of a building that satisfies that preference, such as an access point that includes a ramp, based on corresponding portions of sensor data of each access point of the building.

Figure 3A:
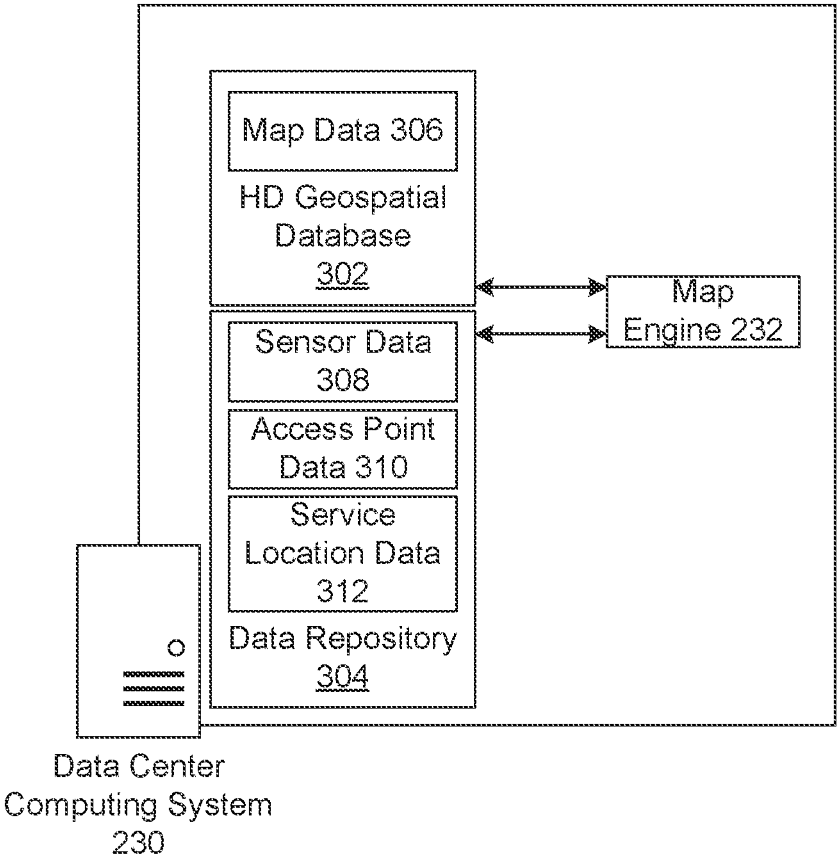
FIGS. 3A-3C and 4 illustrate portions of an exemplary computing environment, in accordance with some exemplary embodiments.
Figure 3B:
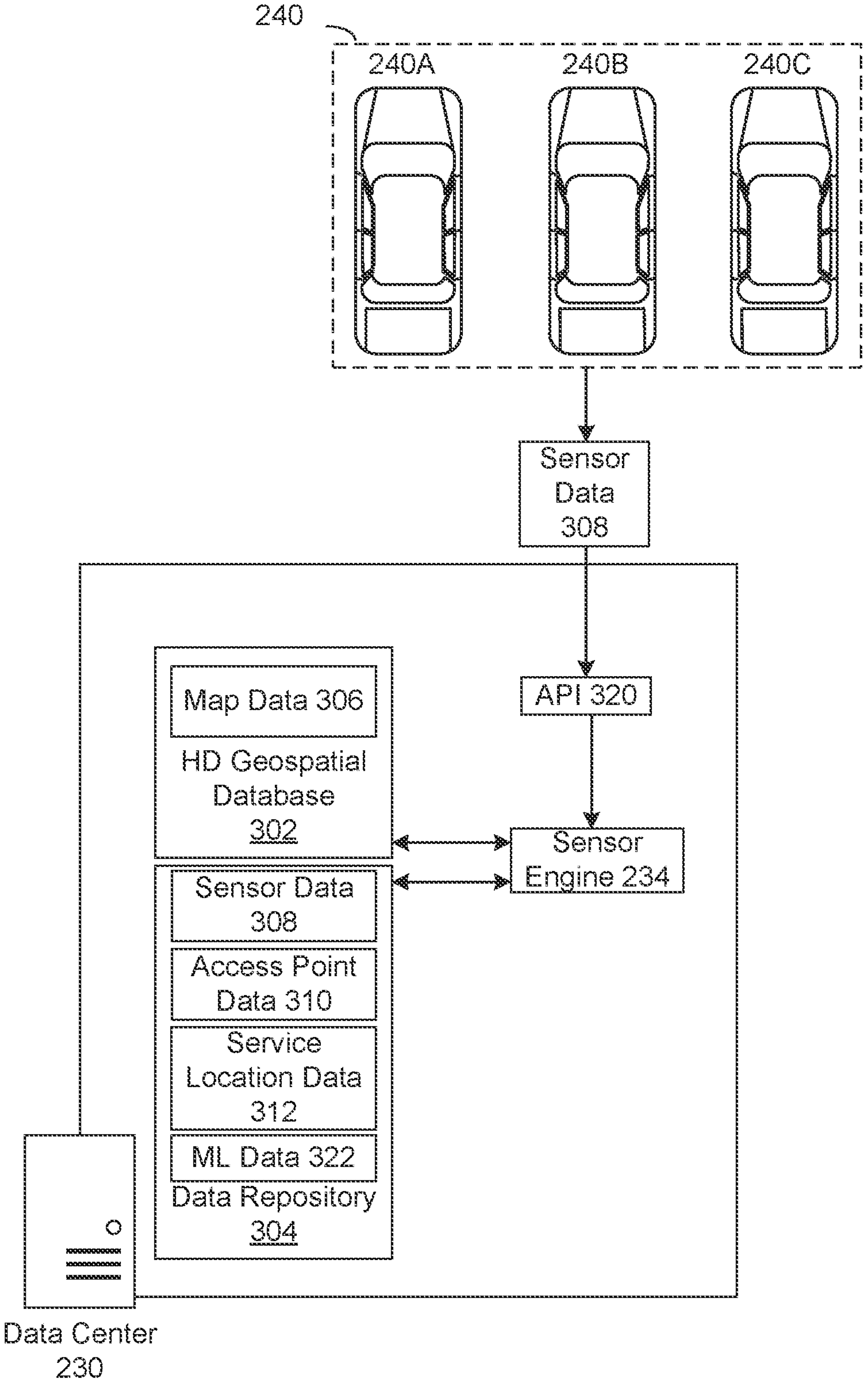
Figure 3C:
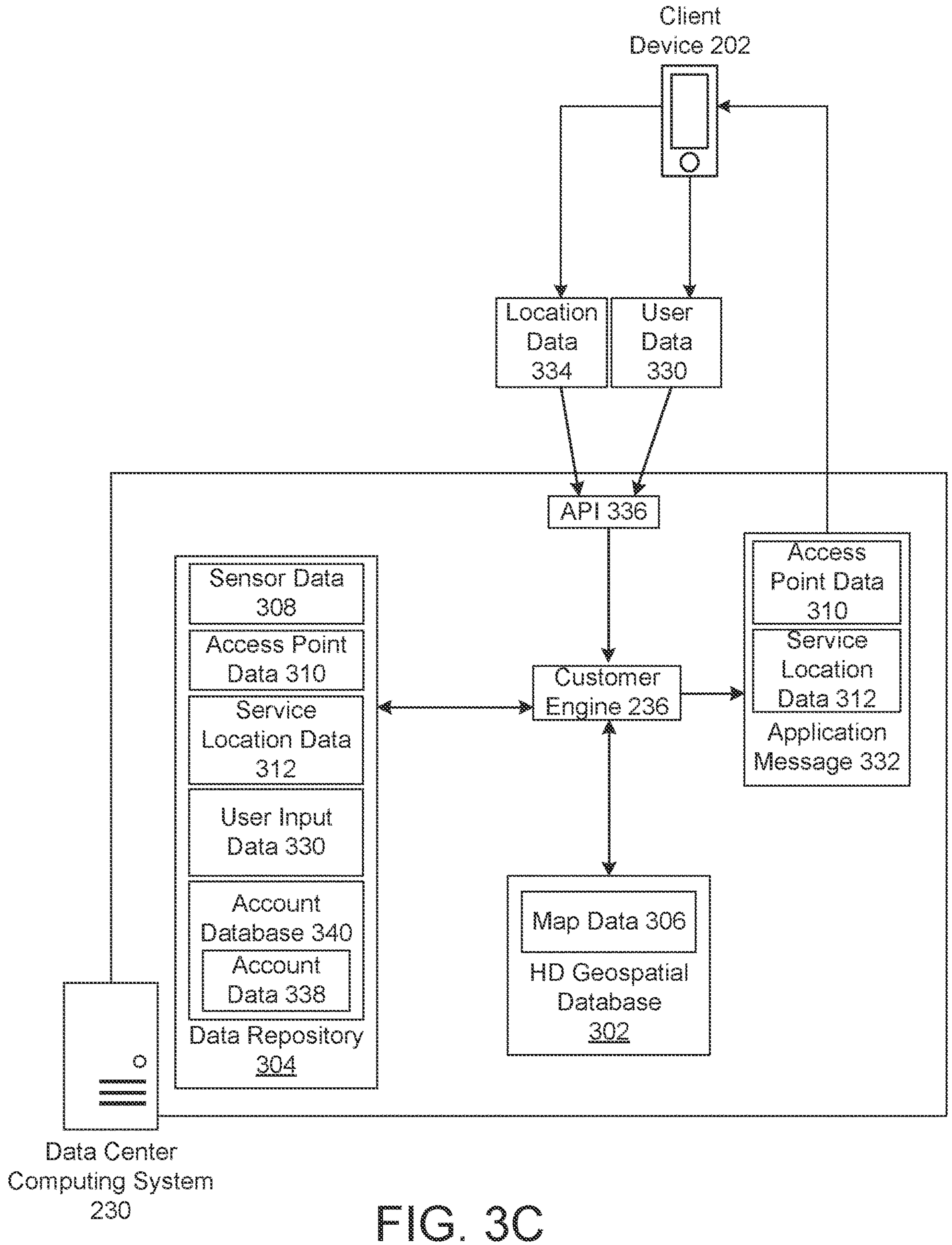

FIGS. 3A, 3B, and 3C illustrate portions of computing environment 200, in accordance with some example embodiments. As described herein, data center computing system 230 may perform any of the example processes described herein, to among other things, determine one or more access points for a building. Referring to FIG. 3A, executed map engine 232 may perform any of the example processes described herein, to among other things, determine one or more access points for a building based on map data 306.

As described herein, executed map engine 232 may obtain map data 306, from a third party computing system. Additionally, map data 306 may include a set of data points that are a diagrammatic representation of geographic areas that one or more autonomous vehicles (AVs) may travel in, such as AVs 240. Moreover, the set of data points are in a three-dimensional coordinate system. Further, each data point of the set of data points may represent a single spatial measurement on the surface of an object in the geographic areas, such as a building. In some examples, map data 306 may include an object layer. The object layer may identify, and label one or more parts of each object identified in the geographic areas of the map data. For instance, for a building, the corresponding object layer may identify one or more parts of the building, such as portions of the building which are an access point, window, awning, etc. Additionally, the object layer may indicate one or more attributes or characteristics of each of the parts of the object, such as for an access point which includes a ramp or is an accessible access point.

Referring back to FIG. 3A, executed map engine 232 may determine or identify one or more buildings within the geographic areas of the map data based on map data 306. Additionally, executed map engine 232 may determine one or more access points for each of the one or more buildings, based on portions of the object layer corresponding to each of the one or more buildings. Moreover, executed map engine 232 may obtain portions of map data 306 corresponding to each of the one or more access points determined for each of the one or more buildings. As described herein, the portions of map data 306 of each of the one or more determined access points may include location information of the corresponding access point (e.g., geographical coordinates), attribute information of the corresponding access point (e.g., information that identifies and characterizes one or more attributes of parts of the access point, such as a ramp, awning, etc.) and location information of the associated building (e.g., geographical coordinates).

Further, executed map engine 232 may generate access point data 310 based on the portions of map data 306 of each of the one or more determined access points. Access point data 310 may include data that identifies one or more determined access points and, in some instances, a building associated with the one or more access points and data that includes information associated with each of the access points, and, in some instances, the building that each of the one or more access points are associated with. In some instances, executed map engine 232 may perform operations that store, within one or more tangible non-transitory memories of data center computing system 230, such as data repository 304, access point data 310.

Referring to FIG. 3B, executed sensor engine 234 may perform any of the example processes described herein, to among other things, determine one or more access points for a building based on sensor data 308. As described herein, sensor data 308 may be generated by one or more sensors of one or more autonomous vehicles (AVs) 240, such as AV 240A, AV 240B, and AV 240C. Additionally, sensor data 308 may correspond to or is associated with one or more objects that the one or more AVs 240 encounters or drives by, such as buildings. Moreover, the one or more AVs 240 may transmit, over one or more networks, such as communications network 220, sensor data 308 to data center computing system 230. An application programming interface (API) 320 of data center computing system 230 may receive sensor data 308 and route sensor data 308 to executed sensor engine 234. Further, executed sensor engine 234 may perform operations that store, within one or more tangible non-transitory memories of data center computing system 230, such as data repository 304.

Additionally, executed sensor engine 234 may utilize one or more trained artificial intelligence or machine learning (AI/ML) processes to identify one or more objects within sensor data 308. In some examples, executed sensor engine 234 may obtain, from ML database 322, an AI/ML dataset that includes one or more parameters of a trained AI/ML process associated with object detection within sensor data 308. Additionally, based on the AI/ML dataset, executed sensor engine 234 may apply the trained AI/ML process to sensor data 308. Based on the application of the trained AI/ML process to sensor data 308, executed sensor engine 234 may identify one or more objects and determine which of the one or more objects is a building based on one or more portions of sensor data 308 of each of the one or more objects. Moreover, based on the application of the trained AI/ML process to the sensor data, executed sensor engine 234 may identify one or more access points of each object identified as a building based on corresponding one or more portions of sensor data 308.

Moreover, executed sensor engine 234 may obtain information associated with each of the identified access points of each building, such as location information of the corresponding access point (e.g., geographical coordinates), attribute information of the corresponding access point (e.g., information that identifies and characterizes one or more attributes of parts of the access point, such as a ramp, awning, etc.) and location information of the associated building (e.g., geographical coordinates). For example, executed sensor engine 234 may apply the trained AI/ML process to portions of sensor data 308 associated with each of the identified access points. Based on the application of the trained AI/ML process to portions of sensor data 308 associated with each of the identified access points, executed sensor engine 234 may determine the information associated with each of the identified access points.

Further, executed sensor engine 234 may generate access point data 310 based on the portions of sensor data 308 of each of the one or more identified access points. Access point data 310 generated by executed sensor engine 234 may include data that identifies one or more determined access points and, in some instances, a building associated with the one or more access points and data that includes information associated with each of the access points. In some instances, executed sensor engine 234 may perform operations that store, within one or more tangible non-transitory memories of data center computing system 230, such as data repository 304, access point data 310.

In some examples, executed sensor engine 234 may determine one or more objects of a building may be an access point comparing corresponding sets of data points of sensor data 308 corresponding to the one or more access points. For example, executed sensor engine 234 may obtain sensor data 308. Sensor data 308 may include a set of data points associated with an object and each of the sets of data points may be generated at different time intervals by one or more sensors of one or more AVs 240. Additionally, executed sensor engine 234 may apply a trained AI/ML process associated with object detection to sensor data 308, as described herein. Moreover, based on the application of the trained AI/ML process to sensor data 308, executed sensor engine 234 may identify an object for a building. Further, executed sensor engine 234 may obtain sets of data points associated with the object. Based on the sets of data points, executed sensor engine 234 may compare the sets of data points corresponding to the object. Executed sensor engine 234 may determine the object is an access point based on the comparison indicating there is a change between the sets of data points. Otherwise, executed sensor engine 234 may determine the object is not an access point.

By way of example, and referring to FIG. 1, the first set of data points and a second set of data points may be associated with object 104. Additionally, the first set of data points may be generated by the one or more sensors of one or more AVs 240 at a first time interval, while the second set of data points may be generated by the one or more sensors of one or more AVs 240 at a second time interval. Further, executed sensor engine 234 may compare the first set of data points and the second set of data points to determine whether object 104 is an access point, such as a door. Based on the comparison, executed sensor engine 234 may determine object 104 is an access point, such as a door. For instance, the first set of data points may correspond to a closed door, while the second set of data points may correspond to an open door.

In other examples, executed sensor engine 234 may determine one or more objects of a building is an access point based on motion characteristics of the one or more objects. For example, based on an application of a trained AI/ML process associated with object detection to a first portion of sensor data 308, such as LIDAR data, executed sensor engine 234 may identify an object of a building. Additionally, executed sensor engine 234 may obtain a second portion of sensor data 308, such as RADAR data, associated with the first portion of sensor data 308. The second portion of sensor data 308, such as RADAR data, may indicate and characterize the kinematic or motion characteristics associated with the door candidate. As such, executed sensor engine 234 may determine a motion characteristic associated with the object. For instance, whether the corresponding RADAR data indicates the object has moved at any point in time when the one or more AVs 240 drove past the door candidate. Based on the determined motion characteristic associated with the object, executed sensor engine 234 may determine whether the object is an access point. For instance, following the example above, executed sensor engine 234 may determine the object is an access point, such as a door, based on determining the corresponding RADAR data indicating the object moved during a time interval when one or more AVs 240 passed by the candidate door. Alternatively, executed sensor engine 234 may determine the object is not an access point based on determining the corresponding RADAR data indicating the object did not move during any time interval the one or more AVs drove past the door candidate.

In various examples, executed sensor engine 234 may utilize sensor data of other objects to determine whether an object of a building is an access point. For example, based on an application of a trained AI/ML process associated with object detection to sensor data 308, executed sensor engine 234 may identify a first object of a building and a number of other objects that are near the door candidate (e.g., within a proximity distance threshold of first object). Additionally, executed sensor engine 234 may obtain, from sensor data 308, sets of data points associated with each of the number of other objects and the first object. Each of the sets of data points may be generated by one or more sensors of one or more AVs 240 at different time intervals. Further, executed sensor engine 234 may compare, for each of the number of identified other objects, the sets of data points with respect to the sets of data points associated with the first object. Executed sensor engine 234 may determine the first object is an access point based on the comparison indicating that one or more of the number of identified other objects disappears or disappears into the first object.

By way of example, and referring to FIG. 1, the first set of data points and a second set of data points may be associated with object 122 and sets of data points may be associated with object 108. Additionally, the first set of data points may be generated by the one or more sensors of one or more AVs 240 at a first time interval, while the second set of data points may be generated by the one or more sensors of one or more AVs 240 at a second time interval. Further, executed sensor engine 234 may compare the first set of data points and the second set of data points with respect to the sets of data points associated with object 108 to determine whether object 108 is an access point, such as a door. Based on the comparison, executed sensor engine 234 may determine object 108 is an access point, such as a door. For instance, the second set of data points may indicate that object 122 suddenly disappears in front of the sets of data points associated with object 108 or the second set of data points may indicate, with respect to the sets of data points associated with object 108, that object 122 goes into object 108.

Referring to FIG. 3C, executed sensor engine 234 may perform any of the example processes described herein, to among other things, confirm or verify one or more access points of one or more buildings identified in access point data 310 based on feedback or input from users. As described herein, the users may be users of the ride-share service supported and managed by data center computing system 230. Additionally, executed customer engine 236 may receive user input data 330 from one or more client devices, such as client device 202. User input data 330 may include information that may verify or confirm one or more access points of one or more buildings identified in access point data 310. Further, executed customer engine 236 may provide application message 332 to a service application, such as service application 205 executing on one or more client devices. The service application may generate a GUI that presents information of each of one or more access points and includes one or more interface elements that enables a user of the one or more client devices to confirm or verify each of the one or more access points presented by the GUI.

By way of example, executed customer engine 236 may obtain, from data repository 304, a portion of access point data 310 that identifies one or more access points of a building and includes information associated with each of the one or more access points (e.g., identifying information of the access point (e.g., a description or image), location information of the corresponding access point (e.g., geographical coordinates), attribute information of the corresponding access point (e.g., information that identifies and characterizes one or more attributes of parts of the access point, such as a ramp, awning, etc.), identifying information of the building (e.g., a description or image), and location information of the associated building (e.g., geographical coordinates)). Additionally, executed customer engine 236 may generate application message 332 and package, within one or more portions of application message 332, the obtained portion of access point data 310. Moreover, executed customer engine 236 may transmit, over one or more communications network, such as communications network 220, application message 332 to service application 205 of client device 202. Service application 205 may generate a GUI to generate a first window and the first window may present information of each of the one or more access points of the portion of access point data 310 included in application message 332 (e.g., an image of the access point and, in some instances, the building of the access point). The first window may also include one or more interface elements that enable the user to provide one or more inputs that indicate, for each of the set of access points, whether the corresponding access point is in fact an access point. Based on one or more inputs provided by the user, service application 205 may generate user input data 330 that indicates, for each of the set of access points, whether the corresponding access point is in fact an access point. Further, service application 205 may transmit, over one or more communications network, such as communications network 220, user input data 330 to data center computing system 230. API 336 may receive user input data 330 and route user input data 330 to executed customer engine 326. Executed customer engine 326 may update corresponding portions of access point data 310 based on user input data 330. For instance, executed customer engine 326 may determine a first access point of a first building is not an access point based on user input data 330. Additionally, executed customer engine 326 may parse access point data 310 to identify portions of access point data 310 corresponding to the first access point of the first building. Further, executed customer engine 326 may update the identified portions of access point data 310 in accordance with the user input data 330 (e.g., that the first access point is not an access point). Alternatively, if user input data 330 indicates the first access point is in fact an access point, executed customer engine 326 may instead update the identified portions of access point data 310 in accordance with the user input data 330 (e.g., that the first access point is confirmed as an access point).

In some instances, the one or more access points presented on the GUI may be based on a user's location. As described herein, the location of the user may be a current location of the client device the user is operating, such as client device 202, or some other location other than the current location of the client device. Additionally, a service application executing on a client device the user is operating may transmit location data, such as location data 334, to executed customer engine 236. In some instances, a user may utilize the service application to create or generate a ride request. The ride request may include the location data indicating the user's location. In such instances, the service application may transmit, over one or more communications networks, such as communications network 220, the ride request of the user to executed customer engine 236. In other instances, while the user is utilizing the service application to generate or create the ride request, the service application may transmit, over one or more communications network, such as communications network 220, the ride request to executed customer engine 236. For instance, service application 205 may generate a GUI that includes a first window. The first window may include one or more interface elements that enable the user to create or generate the ride request, including an interactive map. The interactive map may include an interface element, such as a pin, that the user may adjust to indicate a location, such as a service location, for the ride request. Before the ride request is generated and transmitted to executed customer engine 346, service application 205 may generate location data, such as location data 334, indicating a location corresponding to the position of the interface element of the interactive map. Further, service application 205 may transmit, over one or more communications network, such as communications network 220, the location data to executed customer engine 236.

Additionally, API 336 may receive location data, such as location data 334, or in some instances, a ride request including the location data. Moreover, API 336 may route to executed customer engine 346 the location data or, in some instances, the ride request, and executed customer engine 346 may parse the location data or, in some instances, the ride request, to determine the location of the user. Further, executed customer engine 346 may determine the location of the user is associated with a building based on the location data and the map data 306. Based on portions of map data 306 corresponding to the building, executed customer engine 346 may obtain information of the building, such as an identifying information of the building or a location information of the building. Based on the information of the building, executed customer engine 346 may parse access point data 310 stored in data repository 304 to identify one or more access points associated with the building (e.g., identifying one or more access points and corresponding information include the information of the building determined from map data 306). In some instances, executed customer engine 236 may perform operations that store, within one or more tangible non-transitory memories of data center computing system 230, such as data repository 304, location data 334.

As described herein, executed map engine 232, and executed sensor engine 234, may each independently determine or identify one or more access points of one or more buildings. Additionally, the one or more access points identified by executed map engine 232 may be verified or confirmed by the one or more access points identified by executed sensor engine 234 and vice versa. Additionally, or alternatively, the user input data received by executed customer engine 236 may be utilized to verify and confirm the one or more access points identified by executed map engine 232 and/or executed sensor engine 234. In some instances, the one or more access points identified by executed map engine 232 may be supplemented by the one or more access points identified by executed sensor engine 234 and vice versa. Additionally, or alternatively, the user input data received by executed customer engine 236 may be utilized to supplement the one or more access points identified by executed map engine 232 and/or executed sensor engine 234.

In some examples, functionalities of one or more aspects of data center computing system 230, such as map engine 232, sensor engine 234, customer engine 236 and/or service location engine 238, may be performed by one or more AVs 240 (e.g., such as AV 240A, AV 240B or AV 240C). By way of example, one or more processors of AV 240A may execute an AV sensor engine. The executed AV sensor engine may perform functionalities similar to executed sensor engine 234, as described herein, such as determining one or more access points for a building based on one or more portions of sensor data generated by one or more sensor systems of AV 240A. Additionally, the executed AV sensor engine may generate access point data that includes data identifying one or more determined access points and, in some instances, a building associated with the one or more access points and data that includes information associated with each of the access points (e.g., location information associated with each of the access points). In some instances, the executed AV sensor engine may transmit the access point data to data center computing system 230 and data center computing system 230 may utilize the access point data generated by AV 240A when determining an access point recommendation for a user. Additionally, or alternatively, the executed AV sensor engine may transmit the access point data, along with sensor data generated by one or more sensor systems of AV 240A, to data center computing system 230. Data center computing system 230 may verify the access points identified in the access point data. In some instances, data center computing system 230 may correct a misidentified access point or even identify an object that AV may have missed.

Figure 4:
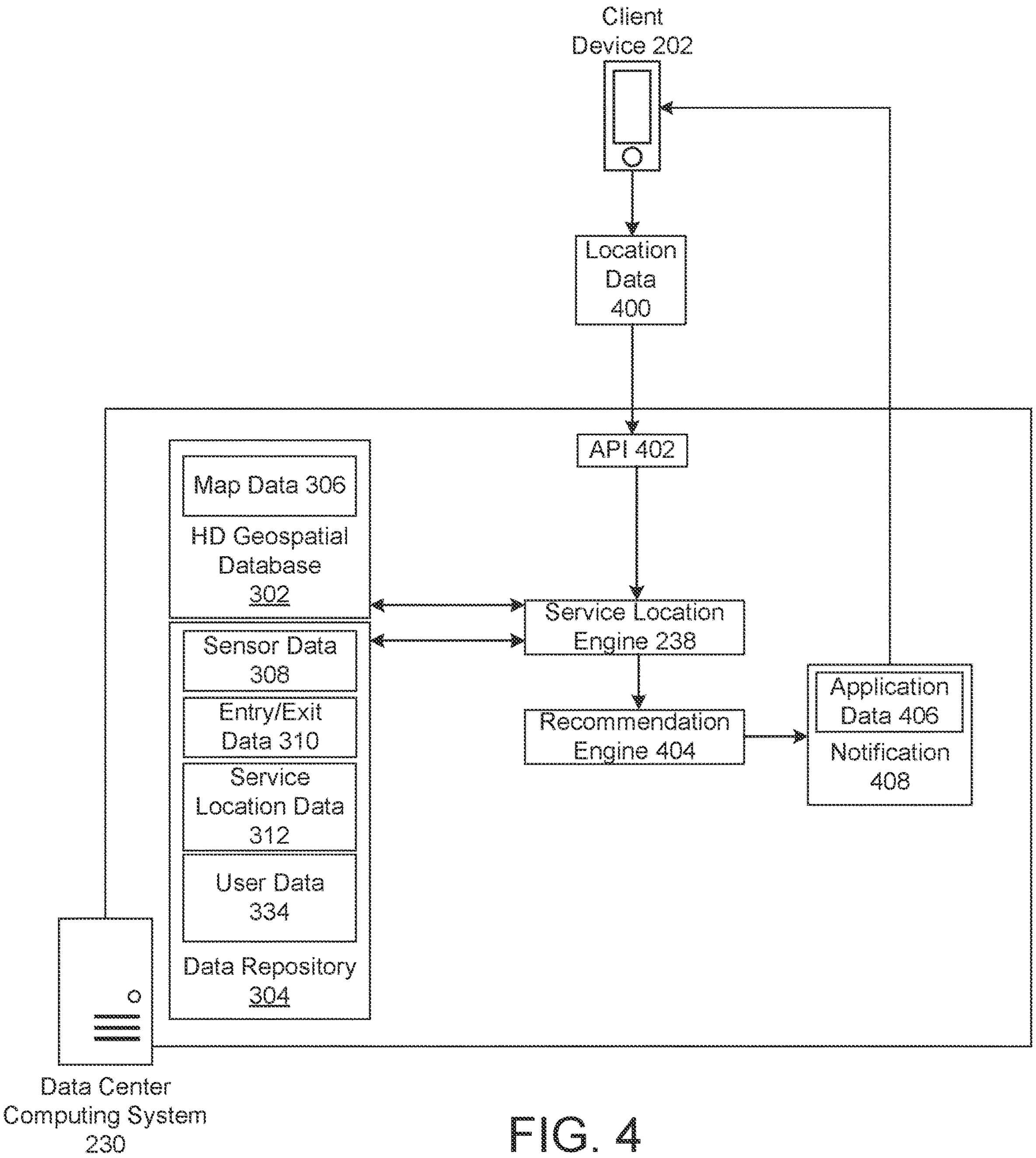

Referring to FIG. 4, executed service location engine 238 may perform any of the example processes described herein, to among other things, determine one or more service locations, such as a pick-up location, a drop-off location or delivery location, for each of the one or more access points identified in access point data 310. Additionally, executed service location engine 238 may utilize map data 306 to determine the one or more service locations. For instance, executed service location engine 238 may obtain, from access point data 310, information associated with each of the one or more access points, such as location information of each of the one or more access points and/or location information of the building associated with each of the one or more access points. Additionally, based on the information of each of the one or more access points, executed service location engine 238 may utilize corresponding portions of map data 306 to identify one or more service locations associated with each of the one or more access points. Moreover, executed service location engine 238 may generate service location data 312 that identifies one or more service locations and corresponding access points. Further, service location data 312 may include information characterizing the one or more service locations and corresponding access points, such as location information associated with each of the one or more service locations and location information of the corresponding access points. In some instances, a service location of an access point may be within a predetermined threshold of the access point. In other instances, executed service location engine 236 may perform operations that store, within one or more tangible non-transitory memories of data center computing system 230, such as data repository 304, service location data 312.

In some examples, executed customer engine 236 may provide access point recommendations to users of the ride-share service that data center computing system 230 manages and supports. Additionally, the access point recommendations may include one or more access points of a building associated with a user's location. By way of example, and referring to FIG. 3C, based on location data obtained from client device 202, executed customer engine 236 may determine a location of a user operating client device 202. Additionally, based on map data 306, executed customer engine 236 may determine the location of the user is associated with a building. Moreover, executed customer engine 236 may parse access point data 310 to identify a set of access points associated with the building. Further, executed customer engine 236 may identify, from access point data 310, information associated with each of the set access points (e.g., identifying information of the access point (e.g., a description or image), location information of the corresponding access point (e.g., geographical coordinates), attribute information of the corresponding access point (e.g., information that identifies and characterizes one or more attributes of parts of the access point, such as a ramp, awning, etc.), identifying information of the building (e.g., a description or image), and location information of the associated building (e.g., geographical coordinates)).

Additionally, executed customer engine 236 may utilize service location data 312 to identify a service location for each of the set of access points. Moreover, executed customer engine 236 may identify, from service location data 312, information associated with each of the identified service locations (e.g., location information). Further, executed customer engine 236 may generate application message 332 and package, within one or more portions of application message 332, one or more portions of access point data 310 that include the information of each of the set of access points and one or more portions of service location data 312 that include information of each service location associated with each of the set of access points. In some instances, executed customer engine 236 may transmit, over one or more communications network, such as communications network 220, application message 332 to service application 205 of client device 202.

Service application 205 of client device 202 may generate a GUI to generate a first window and the first window may present an access point recommendation that includes information of each of the set of access points (e.g., an image of the access point and, in some instances, the building of the access point) and corresponding service locations. Additionally, the first window may include one or more interface elements that enable the user of client device 202 to select one of the sets of access points and corresponding service location. Service application 205 may generate a ride request that utilizes the service location of the selected access point.

In some instances, the access point(s) included in the access point recommendation may be the most convenient access point for a user. For instance, the access point may be the closest access point to the user. By way of example, after receiving location data of the user, determining the location of the user is associated with a building, executed customer engine 236 may parse access point data 310 to identify a set of access points associated with the building. Additionally, executed customer engine 236 may identify, from access point data 310, location information associated with each of the set access points. Based on the location information of each of the set of access points, executed customer engine 236 may determine the distance between each of the set of access points and the location of the user. Moreover, executed customer engine 236 may identify the access point of the set of access points that has the shortest distance. Further, executed customer engine 236, may perform the example process as described herein to generate application message 332 that includes information of the identified access point and corresponding service location.

In another instance, the access point(s) included in the access point recommendation may be within a predetermined distance threshold from the location of the user. In such instance, after receiving location data of the user, determining the location of the user is associated with a building, executed customer engine 236 may parse access point data 310 to identify a set of access points associated with the building. Additionally, executed customer engine 236 may identify, from access point data 310, location information associated with each of the set access points. Based on the location information of each of the set of access points, executed customer engine 236 may determine which of the set of access points is within a predetermined distance threshold of the location of the user. Further, executed customer engine 236, may perform the example process as described herein to generate application message 332 that includes information of the access point(s) that are within the predetermined distance threshold of the location of the user and corresponding service locations.

In other examples, the access point recommendation may be based on environmental conditions associated with a building. In some instances, the environmental conditions may include weather conditions. In such instances, executed customer engine 236 may obtain weather data. The weather data may include weather conditions information of locations associated with one or more access points. Additionally, executed customer engine 236 may take into account the weather conditions information when identifying one or more access points for the access point recommendation.

By way of example, after receiving location data of the user, determining the location of the user is associated with a building, executed customer engine 236 may parse access point data 310 to identify a set of access points associated with the building. Additionally, executed customer engine 236 may obtain weather data. The weather data may indicate it is currently raining at the location of the building. Additionally, executed customer engine 236 may identify, from access point data 310, which of the set of access points includes parts or structures that may protect individuals from the elements, such as an awning. Further, executed customer engine 236, may perform the example process as described herein to generate application message 332 that includes information of the access point that includes parts or structures that may protect individuals from the rain, and corresponding service location.

In other instances, the environmental conditions may be associated with traffic. In such instances, executed customer engine 236 may obtain pedestrian/user traffic data. The traffic data may indicate the level of pedestrian/user/vehicle traffic associated with the one or more access points. In some instances, the user traffic data may be based on the number of client devices that are executing the service application, such as service application 205. The executed service application may periodically provide status updates, calls or pings to data center computing system 230. Data center computing system 230 may generate user traffic data based on such communications which may indicate how heavy the user traffic is at any given location. Additionally, executed customer engine 236 may take into account the level of pedestrian/user/vehicle traffic when identifying one or more access points for the access point recommendation.

By way of example, after receiving location data of the user, determining the location of the user is associated with a building, executed customer engine 236 may parse access point data 310 to identify a set of access points associated with the building. Additionally, executed customer engine 236 may obtain user traffic data. The user traffic data may indicate the level of user traffic at the location of the building. Moreover, executed customer engine 236 may determine the level of pedestrian/user traffic for each of the set of access points of the building based on the pedestrian/user traffic data. For instance, and referring to FIG. 1, executed map engine 232 and/or executed sensor engine 234 may determine object 104 and object 108 are both access points. Additionally, the user traffic data may indicate that there may be a number of users near or around object 104 that is greater than object 108. Additionally, based on current location 114 of client device 202, executed customer engine 236 may determine, based on the map data, current location 114 is associated with building 102 with multiple access points, such as object 104, and object 108. Moreover, executed customer engine 236 may determine object 104 and object 108 are both within a predetermined distance threshold of current location 114. Taken together, executed customer engine 236 may determine object 108 may be a more convenient access point for the user as it has less pedestrians/users near or around object 108. Further, executed customer engine 236, may perform the example process as described herein to generate application message 332 that includes information of the identified access point and corresponding service location.

In various instances, the environmental conditions may be associated with road attributes. In such instances, executed customer engine 236 may obtain road attribute data. The road attribute data may indicate the width of streets or roads associated with the one or more access points. Additionally, executed customer engine 236 may take into account the attributes of one or more roads or streets when identifying one or more access points for the access point recommendation.

By way of example, after receiving location data of the user, determining the location of the user is associated with a building, executed customer engine 236 may parse access point data 310 to identify a set of access points associated with the building. Additionally, executed customer engine 236 may obtain road attribute data. The road attribute data may indicate the width of one or more roads each of the set of access points are facing. Moreover, executed customer engine 236 may determine one or more attributes of the one or more roads or streets each of the set of access points are facing. For instance, and referring to FIG. 1, executed map engine 232 and/or executed sensor engine 234 may determine object 104 and object 108 are access points for a building. Additionally, the road attribute data may indicate that street 118 is narrow (e.g., 40 feet or less in width), while street 116 is not narrow (e.g., greater than 40 feet). Moreover, based on current location 114 of client device 202, executed customer engine 236 may determine, based on the map data, current location 114 is associated with building 102 with multiple access points, such as object 104, and object 108. Further, executed customer engine 236 may determine object 104 and object 108 are both within a predetermined distance threshold of current location 114. Further, based on the road attribute data, executed customer engine 236 may determine that a vehicle, such as one of the AVs 240, stopping and waiting on street 118 may cause traffic congestion due to the width of street 118. Taken together, executed customer engine 236 may identify object 104 as the more convenient access point. Further, executed customer engine 236, may perform the example process as described herein to generate application message 332 that includes information of the identified access point (e.g., object 104 of FIG. 1) and corresponding service location.

In various examples, the access point recommendation may be based on account data. In such examples, the profile data may identify and characterize one or more account profiles of users of the ride-share service that data center computing system 230 supports and manages. In some instances, the access point recommendation for a user may be based on information included in an account profile associated with the user. In such instances, each of the account profiles of the users may include data indicating a preferred access point. The data may further include information associated with the preferred access point, such as identifying information of the access point (e.g., a description, image or number), location information of the corresponding access point (e.g., geographical coordinates), attribute information of the corresponding access point (e.g., information that identifies and characterizes one or more attributes of parts of the access point, such as a ramp, awning, etc.), identifying information of the building (e.g., a description or image), and location information of the associated building (e.g., geographical coordinates). In some instances, the indication of the preferred access point may be based on one or more inputs a user provides to the service application executed on a client device, such as client device 202. The one or more inputs may indicate an access point of a particular building the user has selected as a preferred access point. In other instances, the indication of the preferred access point may be based on historical information included in the account profile of the user. In such instances, executed customer engine 236 may access the historical information and determine the number of times each access point of a particular building has been used for generating, creating, or updating a ride request. Additionally, executed customer engine 236 may determine a particular access point of the building is a preferred access point when the determined number of times the user has selected an access point of the particular building is equal to or more than a predetermined threshold value. Further, executed customer engine 236 may utilize the indicated preferred access point to identify one or more access points for the access point recommendation.

By way of example, and referring to FIG. 3C, after receiving location data of the user, determining the location of the user is associated with a building, executed customer engine 236 may parse access point data 310 to identify a set of access points associated with the building. Additionally, executed customer engine 236 may, access account database 340 and account data 338 to obtain an account profile associated with the user. Based on the account profile of the user, executed customer engine 236 may determine whether the account profile has indicated whether any of the set of access points is a preferred access point. In examples where executed customer engine 236 determines the account profile has indicated one of the set of access points is a preferred access point, executed customer engine 236 may obtain information associated with the preferred access point (e.g., identifying information of the access point (e.g., a description, image or number), location information of the corresponding access point (e.g., geographical coordinates), attribute information of the corresponding access point (e.g., information that identifies and characterizes one or more attributes of parts of the access point, such as a ramp, awning, etc.), identifying information of the building (e.g., a description or image), and location information of the associated building (e.g., geographical coordinates). In some instances, the information may be obtained from access point data 310. In other instances, the information may be obtained from account data 338. Further, executed customer engine 236, may perform the example process as described herein to generate application message 332 that includes information of the preferred access point and corresponding service location.

In other instances, the access point recommendation for a user may be based on information included in account profiles associated with other users. In such instances, executed customer engine 236 may obtain historical information of other users that indicates access points and corresponding service locations that other users of the ride-share service had selected for their previous ride requests. Additionally, based on the historical information of other users, executed customer engine 236 may identify one or more access points for the access point recommendation.

By way of example, and referring to FIG. 3C, after receiving location data of the user, determining the location of the user is associated with a building, executed customer engine 236 may parse access point data 310 to identify a set of access points associated with the building. Additionally, executed customer engine 236 may, access account database 340 and account data 338 to obtain an account profile associated with the user. Based on the account profile of the user, executed customer engine 236 may determine whether the account profile has indicated whether any of the set of access points is a preferred access point. In examples where executed customer engine 236 determines the account profile has not indicated one of the sets of access points is a preferred access point, executed customer engine 236 may obtain from account database 340, historical information of other users. The historical information of other users may indicate access points and corresponding service locations that the other users had selected for their previous ride requests. Moreover, executed customer engine 236 may determine, for the building, a global preferred access point for the building, based on the historical information of the other users. As described herein, the global preferred access point is an access point that the other users selected in the generation, creation and updating of their respective ride requests. Additionally, the global preferred access point may indicate the access point that was determined as selected a number of times in the generation, creation and updating of ride requests of other users is greater than a predetermined threshold value. Further, executed customer engine 236 may obtain information associated with the global preferred access point (e.g., identifying information of the access point (e.g., a description, image or number), location information of the corresponding access point (e.g., geographical coordinates), attribute information of the corresponding access point (e.g., information that identifies and characterizes one or more attributes of parts of the access point, such as a ramp, awning, etc.), identifying information of the building (e.g., a description or image), and location information of the associated building (e.g., geographical coordinates). Executed customer engine 236, may perform the example process as described herein to generate application message 332 that includes information of the global preferred access point and corresponding service location.

In various instances, executed customer engine 236 may determine that information included in the account profile of a user may not indicate a preferred access point for a building. Additionally, executed customer engine 236 may determine that information included in the account profiles associated with other users may not indicate a global preferred access point for the building. In such instances, executed customer engine 236 may identify one or more access points for an access point recommendation for the user based on the location of the user, weather conditions and/or environmental conditions.

In some instances, the access point recommendations may be based on one or more preferences of the users. In such examples, each account profile may include information identifying and characterizing one or more preferences of the user. Additionally, executed customer engine 236 may utilize the one or more preferences of the users to identify one or more access points for the access point recommendation.

By way of example, after receiving location data of the user, determining the location of the user is associated with a building, executed customer engine 236 may parse access point data 310 to identify a set of access points associated with the building. Additionally, executed customer engine 236 may, access account database 340 and account data 338 to obtain an account profile associated with the user. Based on the account profile of the user, executed customer engine 236 may determine a preference indicating that the user may require additional assistance. Moreover, based on the one or more portions of sensor data 308, executed customer engine 236 may determine whether any of the set of access points satisfies the preference indicating the user may need additional assistance. For instance, for each of the set of access points, executed customer engine 236 may parse corresponding portions of sensor data 308 to determine whether any of the set of access points includes a part that may satisfy the additional assistance preference, such as a ramp. For an access point of the set of access points determined to satisfy the ride preference, executed customer engine 236 may obtain information associated with the access point (e.g., identifying information of the access point (e.g., a description, image or number), location information of the corresponding access point (e.g., geographical coordinates), attribute information of the corresponding access point (e.g., information that identifies and characterizes one or more attributes of parts of the access point, such as a ramp, awning, etc.), identifying information of the building (e.g., a description or image), and location information of the associated building (e.g., geographical coordinates)). As described herein, the information may be obtained from portions of sensor data associated with the identified access point, such as images of the access point, location information of the access point, and, in some instances, a description of one or more attributes or characteristics of the access point, such as the type (e.g., door, gate, etc.). Further, executed customer engine 236 may perform the example process as described herein to generate application message 332 that includes information of the access point that satisfies the preference of the user and corresponding service locations.

In other instances, executed sensor engine 234 may perform any of the example processes described herein, to among other things, verify a presence or existence of one or more access points of one or more buildings. By way of example, and referring to FIG. 3C, service application 205 may generate a GUI that includes a first window that includes one or more interface elements that enable the user to generate the ride request. Additionally, executed customer engine 236 may perform any of the example processes described herein, to among other things, provide an access recommendation based at least on the location of the user, to service application 205. Service application 205 may cause GUI to present a second window that presents information of each of the one or more access points of the access point recommendation. For instance, the second window may include an interactive map and an interface element such as a pin, which is positioned on a location on the interactive map that represents an access point included in the access point recommendation. Additionally, the user operating client device 202 may provide one or more inputs that adjust the recommended identified access point and corresponding service location to a new location. For instance, and following the example above, the user may provide one or more inputs that adjusts or moves the interface element to a new position corresponding to a different location than the access point. Moreover, service application 205 may cause the GUI to present a third window that prompts the user to confirm whether the new location has an access point nearby. For instance, the third window may include one or more interface elements that enable the user to provide one or more inputs that indicate whether an access point is located near the newly indicated location.

Further, service application 205 may generate user input data that indicates the newly indicated location may have an access point nearby and includes location information of the newly indicated location, such as geographical coordinates. In some instances, service application 205 may transmit, over one or more communications network, such as communications network 220, to executed customer engine 236. Executed customer engine 236 may then cause executed sensor engine 234 to parse through sensor data associated with the location information of the newly indicated location to identify whether another access point exists at a location identified in the location information. Additionally, executed sensor engine 234 may route one or more AVs 240 to the location identified in the location information to capture sensor data of that environment. That way, executed sensor engine 234 may perform operations, as described herein, to determine whether an access point does exist at the location identified in the location information of the newly indicated location.

Figure 5:
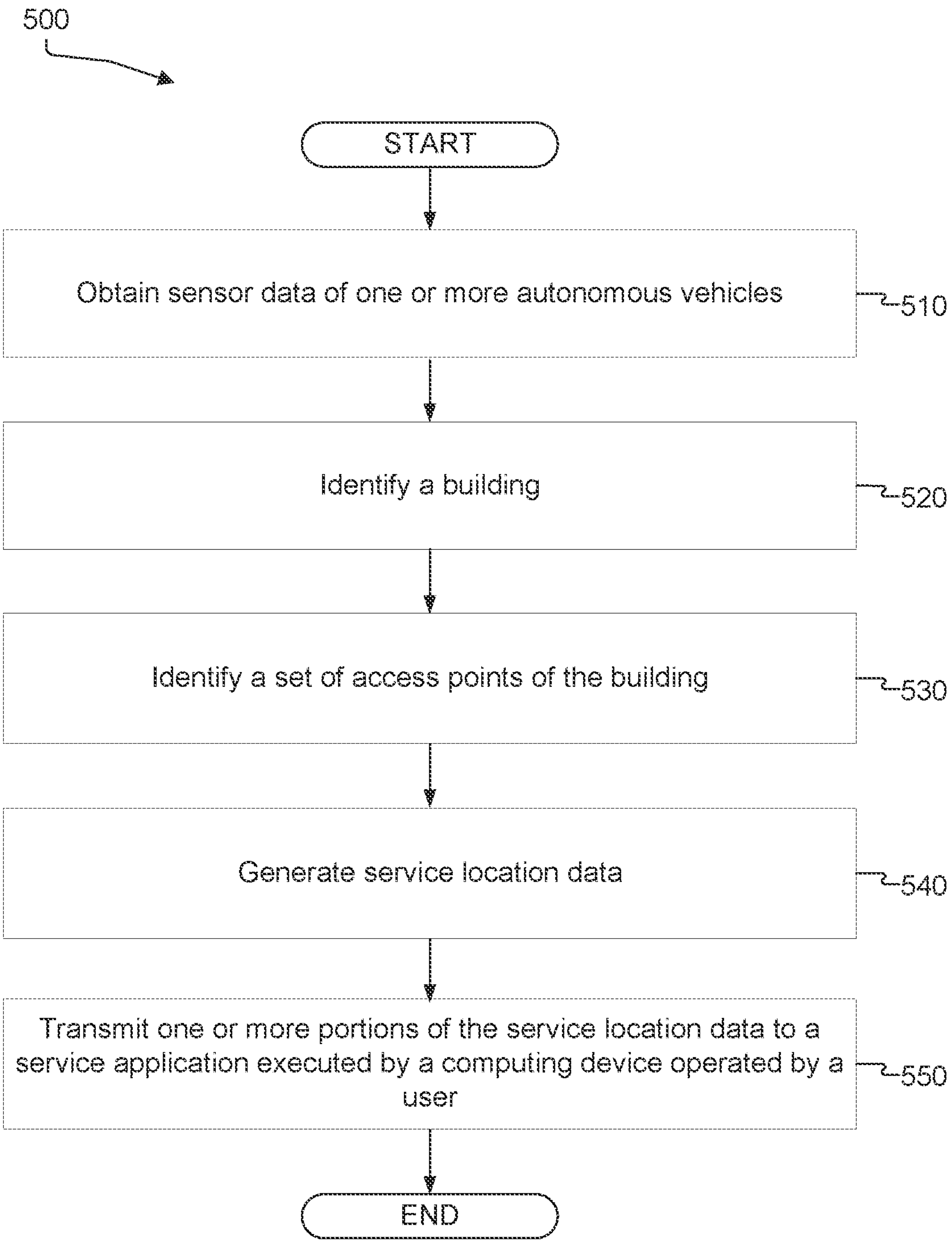
FIG. 5 illustrates a flowchart of an exemplary process for identifying one or more access points of a building.

FIG. 5 is a flow chart of an example process 500 for identifying one or more access points of a building and corresponding service location. In some instances, one or more components of computing environment 200 may perform all or a portion of the steps of example process 500, which include but are not limited to obtaining sensor data of one or more autonomous vehicles (AVs), identifying a building based on the sensor data, generating service location data, and transmitting one or more portions of the service location data to a service application executed by a computing device operated by a user.

Referring to FIG. 5, data center computing system 230 may obtain sensor data of one or more autonomous vehicles (AVs) (e.g., step 510). In some examples, executed sensor engine 234 may obtain sensor data, such as sensor data 308, from one or more AVs 240, such as AV 240A, AV 240B and AV 240C. Additionally, the sensor data may correspond to or is associated with one or more objects that the one or more AVs 240 encounters or drives by, such as buildings. Moreover, the sensor data may be generated by one or more sensors of the one or more AVs 240. Examples of the one or more sensors include a camera sensor, a Light sensor (e.g., light detection and ranging systems, ambient light sensors, infrared sensors, etc.), audio sensor, RADAR systems, and location based sensors (e.g., GPS systems). Further, executed sensor engine 234 may utilize one or more trained artificial intelligence or machine learning (AI/ML) processes to identify one or more objects within the sensor data.

Referring to FIG. 5, data center computing system 230 may identify a building (e.g., step 520). In some examples, executed sensor engine 234 may identify a building based on the sensor data. In such examples, executed sensor engine 234 may utilize one or more trained artificial intelligence or machine learning (AI/ML) processes to identify one or more objects within the sensor data. For instance, executed sensor engine 234 may apply the trained AI/ML process to the sensor data. Additionally, based on the application of the trained AI/ML process to the sensor data, executed sensor engine 234 may identify one or more objects and determine which of the one or more objects is a building based on one or more portions of the sensor data of each of the one or more objects.

Referring to FIG. 5, data center computing system 230 may identify a set of access points of the building (e.g., step 530). In some examples, executed sensor engine 234 may identify a set of access points of the building based on sensor data associated with the building. For instance, based on the application of the trained AI/ML process to the sensor data, executed sensor engine 234 may identify one or more access points of each object identified as a building based on corresponding one or more portions of the sensor data. Additionally, executed sensor engine 234 may obtain information associated with each of the identified access points of each building based on corresponding portions of sensor data (e.g., location information of the corresponding access point (e.g., geographical coordinates), attribute information of the corresponding access point (e.g., information that identifies and characterizes one or more attributes of parts of the access point, such as a ramp, awning, etc.) and location information of the associated building (e.g., geographical coordinates).

Referring to FIG. 5, data center computing system 230 may generate service location data (e.g., step 540). In some examples, the service location data may identify, for each of the set of access points, a drop-off or pick-up location. In other examples, executed service location engine 238 may utilize map data to determine the one or more service locations. In some instances, the map data may be obtained from a third party computing device.

For instance, executed service location engine 238 may obtain, from access point data 310, information associated with each of the one or more access points, such as location information of each of the one or more access points and/or location information of the building associated with each of the one or more access points. Additionally, based on the information of each of the one or more access points, executed service location engine 238 may utilize corresponding portions of map data 306 to identify one or more service locations associated with each of the one or more access points. Moreover, executed service location engine 238 may generate service location data 312 that identifies one or more service locations and corresponding access points. Further, service location data 312 may include information characterizing the one or more service locations and corresponding access points, such as location information associated with each of the one or more service locations and location information of the corresponding access points. In some instances, a service location of an access point may be within a predetermined threshold of the access point.

Referring to FIG. 5, data center computing system 230 may transmit one or more portions of the service location data to a service application executed by a computing device operated by a user (e.g., step 550). In some examples, the service application, such as service application 205, may implement operations that generate a graphical user interface (GUI). In such examples, the GUI may include a graphical element for the drop-off or pick-up location of each of the set of access points. Additionally, the GUI may include a graphical element for each of the set of access points.

In other examples, executed customer engine 236 may generate application message, such as application message 332, and package, within one or more portions of the application message, one or more portions of service location data that includes information of each service location associated with each of the set of access points. In some instances, executed customer engine 236 may package, within one or more portions of the application message, information of each of the set of access points, such as one or more corresponding portions of access point data 310.

Figure 6:
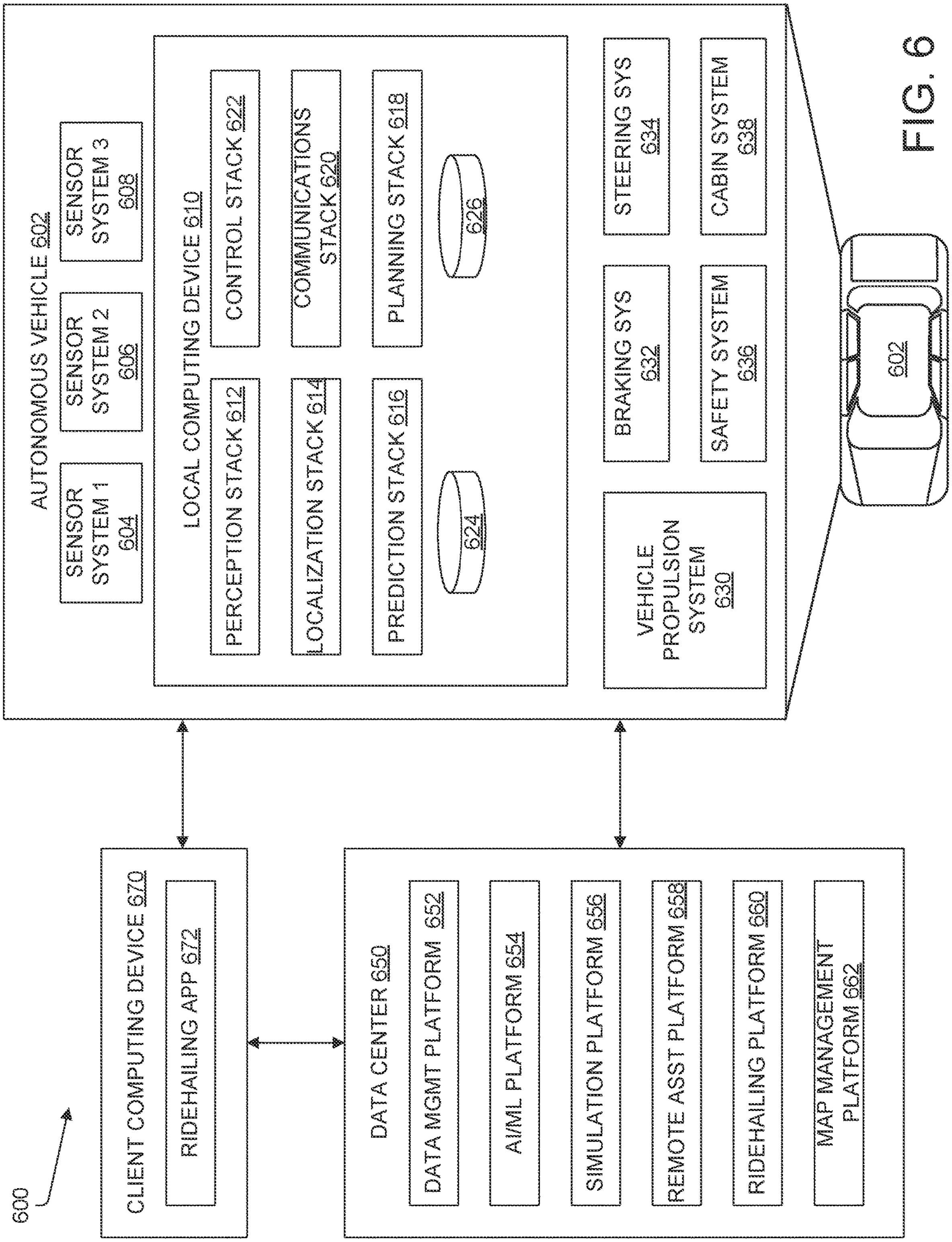
FIG. 6 illustrates an example system environment that can be used to facilitate autonomous vehicle (AV) dispatch and operations, according to some aspects of the disclosed technology.

FIG. 6 is a diagram illustrating an example autonomous vehicle (AV) environment 600, according to some examples of the present disclosure. One of ordinary skill in the art will understand that, for AV environment 600 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 602 can navigate roadways without a human driver based on sensor signals generated by multiple sensor systems 604, 606, and 608. The sensor systems 604-608 can include one or more types of sensors and can be arranged about the AV 602. For instance, the sensor systems 604-608 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other examples may include any other number and type of sensors.

The AV 602 can also include several mechanical systems that can be used to maneuver or operate the AV 602. For instance, the mechanical systems can include a vehicle propulsion system 630, a braking system 632, a steering system 634, a safety system 636, and a cabin system 638, among other systems. The vehicle propulsion system 630 can include an electric motor, an internal combustion engine, or both. The braking system 632 can include an engine brake, brake pads, actuators, and/or any other suitable componentry configured to assist in decelerating the AV 602. The steering system 634 can include suitable componentry configured to control the direction of movement of the AV 602 during navigation. The safety system 636 can include lights and signal indicators, a parking brake, airbags, and so forth. The cabin system 638 can include cabin temperature control systems, in-cabin entertainment systems, and so forth. In some examples, the AV 602 might not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

The AV 602 can include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a localization stack 614, a prediction stack 616, a planning stack 618, a communications stack 620, a control stack 622, an AV operational database 624, and an HD geospatial database 626, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the localization stack 614, the HD geospatial database 626, other components of the AV, and other data sources (e.g., the data center 650, the client computing device 670, third party data sources, etc.). The perception stack 612 can detect and classify objects and determine their current locations, speeds, directions, and the like. In addition, the perception stack 612 can determine the free space around the AV 602 (e.g., to maintain a safe distance from other objects, change lanes, park the AV, etc.). The perception stack 612 can identify environmental uncertainties, such as where to look for moving objects, flag areas that may be obscured or blocked from view, and so forth. In some examples, an output of the perception stack 612 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 614 can determine the AV's position and orientation (pose) using different methods from multiple systems (e.g., GPS, IMUs, cameras, LIDAR, RADAR, ultrasonic sensors, the HD geospatial database 626, etc.). For example, in some cases, the AV 602 can compare sensor data captured in real-time by the sensor systems 604-608 to data in the HD geospatial database 626 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

Prediction stack 616 can receive information from the localization stack 614 and objects identified by the perception stack 612 and predict a future path for the objects. In some examples, the prediction stack 616 can output several likely paths that an object is predicted to take along with a probability associated with each path. For each predicted path, the prediction stack 616 can also output a range of points along the path corresponding to a predicted location of the object along the path at future time intervals along with an expected error value for each of the points that indicates a probabilistic deviation from that point.

Planning stack 618 can determine how to maneuver or operate the AV 602 safely and efficiently in its environment. For example, the planning stack 618 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 602 from one point to another and outputs from the perception stack 612, localization stack 614, and prediction stack 616. The planning stack 618 can determine multiple sets of one or more mechanical operations that the AV 602 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 618 can select from multiple backup plans to carry out. For example, while preparing to change lanes to turn right at an intersection, another vehicle may aggressively cut into the destination lane, making the lane change unsafe. The planning stack 618 could have already determined an alternative plan for such an event. Upon its occurrence, it could help direct the AV 602 to go around the block instead of blocking a current lane while waiting for an opening to change lanes.

Control stack 622 can manage the operation of the vehicle propulsion system 630, the braking system 632, the steering system 634, the safety system 636, and the cabin system 638. The control stack 622 can receive sensor signals from the sensor systems 604-608 as well as communicate with other stacks or components of the local computing device 610 or a remote system (e.g., the data center 650) to effectuate operation of the AV 602. For example, the control stack 622 can implement the final path or actions from the multiple paths or actions provided by the planning stack 618. This can involve turning the routes and decisions from the planning stack 618 into commands for the actuators that control the AV's steering, throttle, brake, and drive unit.

Communications stack 620 can transmit and receive signals between the various stacks and other components of the AV 602 and between the AV 602, the data center 650, the client computing device 670, and other remote systems. The communications stack 620 can enable the local computing device 610 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 620 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 626 can store HD maps and related data of the streets upon which the AV 602 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

AV operational database 624 can store raw AV data generated by the sensor systems 604-608, stacks 612-622, and other components of the AV 602 and/or data received by the AV 602 from remote systems (e.g., the data center 650, the client computing device 670, etc.). In some examples, the raw AV data can include HD LIDAR point cloud data, image data, RADAR data, GPS data, and other sensor data that the data center 650 can use for creating or updating AV geospatial data or for creating simulations of situations encountered by AV 602 for future testing or training of various machine learning algorithms that are incorporated in the local computing device 610.

Data center 650 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 650 can include one or more computing devices remote to the local computing device 610 for managing a fleet of AVs and AV-related services. For example, in addition to managing the AV 602, the data center 650 may also support a ride-hailing service (e.g., a ridesharing service), a delivery service, a remote/roadside assistance service, street services (e.g., street mapping, street patrol, street cleaning, street metering, parking reservation, etc.), and the like.

Data center 650 can send and receive various signals to and from the AV 602 and the client computing device 670. These signals can include sensor data captured by the sensor systems 604-608, roadside assistance requests, software updates, ride-hailing/ridesharing pick-up and drop-off instructions, and so forth. In this example, the data center 650 includes a data management platform 652, an Artificial Intelligence/Machine Learning (AI/ML) platform 654, a simulation platform 656, a remote assistance platform 658, and a ride-hailing platform 660, and a map management platform 662, among other systems.

Data management platform 652 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ride-hailing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

Simulation platform 656 can enable testing and validation of the algorithms, machine learning models, neural networks, and other development efforts for the AV 602, the remote assistance platform 658, the ride-hailing platform 660, the map management platform 662, and other platforms and systems. Simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from a cartography platform (e.g., map management platform 662); modeling the behavior of other vehicles, bicycles, pedestrians, and other dynamic elements; simulating inclement weather conditions, different traffic scenarios; and so on.

Remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

Ride-hailing platform 660 can interact with a customer of a ride-hailing service via a ride-hailing application 672 executing on the client computing device 670. The client computing device 670 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 672. The client computing device 670 can be a customer's mobile computing device or a computing device integrated with the AV 602 (e.g., the local computing device 610). The ride-hailing platform 660 can receive requests to pick up or drop off from the ride-hailing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ride-hailing platform 660 may incorporate the map viewing services into the client application 672 to enable passengers to view the AV 602 in transit en route to a pick-up or drop-off location, and so on.

While the AV 602, the local computing device 610, and the autonomous vehicle environment 600 are shown to include certain systems and components, one of ordinary skill will appreciate that the AV 602, the local computing device 610, and/or the autonomous vehicle environment 600 can include more or fewer systems and/or components than those shown in FIG. 6. For example, the AV 602 can include other services than those shown in FIG. 6 and the local computing device 610 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 6. An illustrative example of a computing device and hardware components that can be implemented with the local computing device 610 is described below with respect to FIG. 8.

In some examples, one or more client devices, such as client device 202 (or client computing device 670 illustrated in FIG. 6), may each have one or more tangible, non-transitory memories, such as memory 204, that store data and/or software instructions, and one or more processors (e.g., processor 203), configured to execute the software instructions. The one or more tangible, non-transitory memories may, in some aspects, store application programs, application engines or modules, and other elements of code executable by the one or more processors. As illustrated in FIG. 2, client device 202 may store within the one or more tangible, non-transitory memories, an executable service application 205, which may be provisioned to client device 202 by data center computing system 230. Additionally, each client device, such as client device 202 may include a display unit, such as display unit 206A, configured to present interface elements to a corresponding user, such as the user of client device 202, and an input unit, such as input unit 206B, configured to receive input from the user (e.g., in response to the interface elements presented through the display unit). By way of example, the display unit may include, but is not limited to, an LCD display unit, a TFT display, and OLED display or other appropriate type of display unit, and input unit may include, but is not limited to, a keypad, keyboard, touchscreen, fingerprint scanner, voice activated control technologies, or appropriate type of input unit. Further, in additional aspects (not illustrated in FIG. 2), the functionalities of the display unit and input unit may be combined into a single device, e.g., a pressure-sensitive touchscreen display unit that presents interface elements and receives input from a user, such as the user of client device 202. In various instances, client device 202 may include an embedded computing device (e.g., in communication with a smart textile or electronic fabric), and any other type of computing device that may be configured to store data and software instructions, execute software instructions to perform operations, and/or display information on an interface device or unit, such as display unit 206A.

Moreover, each client device, such as client device 202, may include a communications interface, such as communications interface 206C, such as a wireless transceiver device, coupled to a processor of client device 202, such as processor 203, and configured by the processor to establish and maintain communications with communications network 220 via one or more communication protocols, such as Wi-Fi®, Bluetooth®, NFC, a cellular communications protocol (e.g., LTE®, CDMA®, GSM®, etc.), or any other suitable communications protocol. In some instances, each of the client devices, such as client device 202, may also establish communications with one or more additional computing systems or devices operating within computing environment 200 across a wired or wireless communications channel, such as communications network 220 (e.g., via the communications interface 206C using any appropriate communications protocol).

Figure 7:
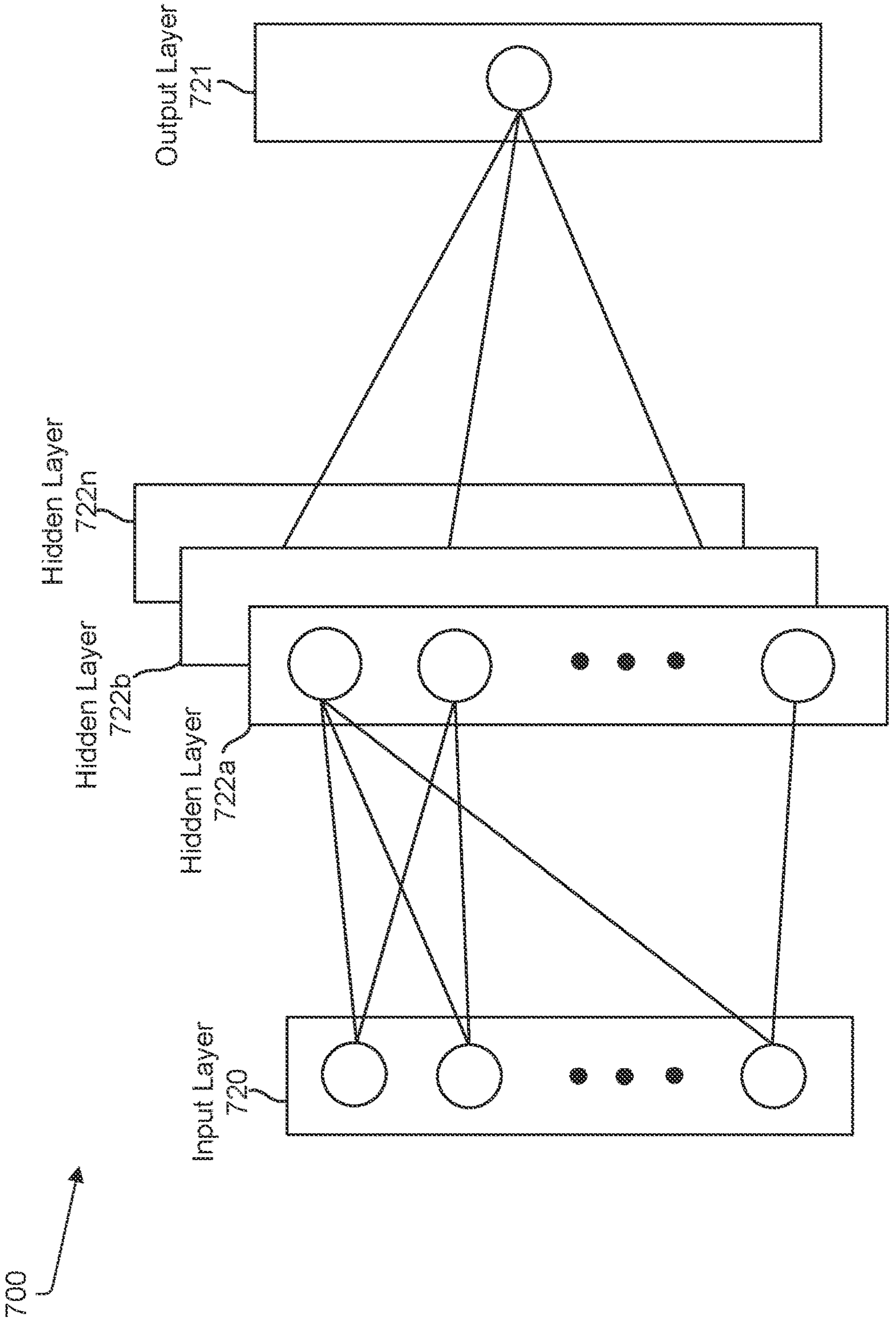
FIG. 7 illustrates an example of a deep learning neural network, according to some aspects of the disclosed technology.

In FIG. 7, the disclosure now turns to a further discussion of models that can be used through the environments and techniques described herein. FIG. 7 is an example of a deep learning neural network 700 that can be used to implement all or a portion of the systems and techniques described herein (e.g., neural network 700 can be used to implement a perception module (or perception system) as discussed above). An input layer 720 can be configured to receive sensor data and/or data relating to an environment surrounding an AV. Neural network 700 includes multiple hidden layers 722*a*, 722*b*, through 722*n*. The hidden layers 722*a*, 722*b*, through 722*n* include "n" number of hidden layers, where "n" is an integer greater than or equal to one. The number of hidden layers can be made to include as many layers as needed for the given application. Neural network 700 further includes an output layer 721 that provides an output resulting from the processing performed by the hidden layers 722*a*, 722*b*, through 722*n*.

Neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722*a*. For example, as shown, each of the input nodes of the input layer 720 is connected to each of the nodes of the first hidden layer 722*a*. The nodes of the first hidden layer 722*a* can transform the information of each input node by applying activation functions to the input node information. The information derived from the transformation can then be passed to and can activate the nodes of the next hidden layer 722*b*, which can perform their own designated functions. Example functions include convolutional, up-sampling, data transformation, and/or any other suitable functions. The output of the hidden layer 722*b* can then activate nodes of the next hidden layer, and so on. The output of the last hidden layer 722*n* can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722*a*, 722*b*, through 722*n* in order to provide the output through the output layer 721.

In some cases, the neural network 700 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as E_total=Σ(½ (target-output)^2). The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for down sampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 8:
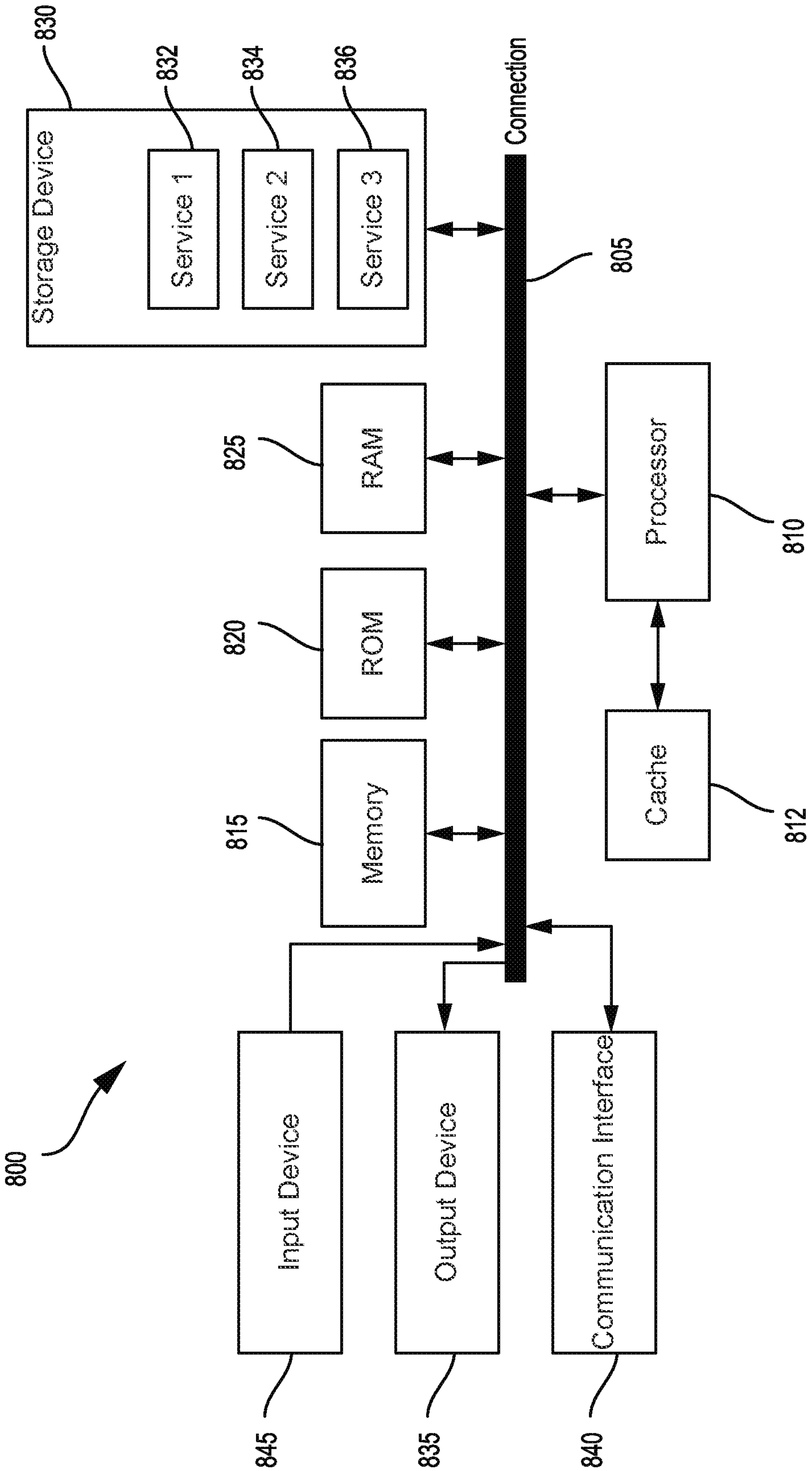
FIG. 8 illustrates an example processor-based system with which some aspects of the subject technology can be implemented.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with the necessary hardware components, such as processor 810, connection 805, output device 835, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Illustrative examples of the disclosure include:

Aspect 1: A computing system comprising: a communications interface; a memory storing instructions; and at least one processor coupled to the communications interface and the memory, the at least one processor being configured to execute the instructions to: obtain sensor data of one or more autonomous vehicles (AV); identify a building based on the sensor data; identify a set of access points of the building based on sensor data associated with the building; generate service location data, the service location data identifying, for each of the set of access points, a drop-off or pick-up location; and transmit one or more portions of the service location data to a service application executed by a computing device operated by a user, the service application implements operations that generate a graphical user interface (GUI) including a graphical element for the drop-off or pick-up location of each of the set of access points.

Aspect 2: The computing system of Aspect 1, wherein the at least one processor is further configured to: receive, from the service application, location data identifying a current location of the computing device; determine the current location of the computing device is associated with the building; generate application data including the one or more portions of the service location data based on the location data and the service location data; and transmit the application data to the service application, wherein the service application utilizes the application data to generate the GUI.

Aspect 3: The computing system of Aspect 1 or 2, wherein the at least one processor is further configured to: obtain map data; obtain user input data characterizing at least one of the set of access points; and wherein identifying the set of access points is further based on the map data and the user input data.

Aspect 4. The computing system of Aspects 1 to 3, wherein the GUI includes a graphical element for each of the set of access points.

Aspect 5. The computing system of Aspects 1 to 4, wherein to identify the set of access points of the building, the at least one processor is further configured to: detect, within portions of the sensor data associated with the building, a set of objects; for each of the set of objects, determine one or more access point candidates based on corresponding portions of sensor data; and for each of the one or more access point candidates, determine a motion characteristic based on corresponding portions of sensor data, wherein one or more of the set of access points has a motion characteristic that corresponds to movement.

Aspect 6. The computing system of Aspects 1 to 5, wherein the at least one processor is further configured to: determine the one or more of the set of access points that satisfy a candidate criterion, wherein the one or more portions of the service location data include the drop-off or pick-up location of each of the one or more of the set of access points that satisfy the candidate criterion.

Aspect 7. The computing system of Aspects 1 to 6, wherein the candidate criterion is associated with a predetermined distance threshold, the predetermined distance threshold specifies a maximum distance from an access point to a current location of a computing device.

Aspect 8: A computer-implemented method comprising: obtaining sensor data of one or more autonomous vehicles (AV); identifying a building based on the sensor data; identifying a set of access points of the building based on sensor data associated with the building; generating service location data, the service location data identifying, for each of the set of access points, a drop-off or pick-up location; and transmitting one or more portions of the service location data to a service application executed by a computing device operated by a user, the service application implements operations that generate a graphical user interface (GUI) including a graphical element for the drop-off or pick-up location of each of the set of access points.

Aspect 9: The computer-implemented method of Aspect 8, further comprising: receiving, from the service application, location data identifying a current location of the computing device; determining the current location of the computing device is associated with the building; generating application data including the one or more portions of the service location data based on the location data and the service location data; and transmitting the application data to the service application, wherein the service application utilizes the application data to generate the GUI.

Aspect 10: The computer-implemented method of Aspect 8 or 9, further comprising: obtaining map data; obtain user input data characterizing at least one of the set of access points; and wherein identifying the set of access points is further based on the map data and the user input data.

Aspect 11: The computer-implemented method of Aspects 8 to 10, wherein the GUI includes a graphical element for each of the set of access points.

Aspect 12: The computer-implemented method of Aspects 8 to 11, wherein identifying the set of access points of the building includes: detecting, within portions of the sensor data associated with the building, a set of objects; for each of the set of objects, determining one or more access point candidates based on corresponding portions of sensor data; and for each of the one or more access point candidates, determining a motion characteristic based on corresponding portions of sensor data, wherein one or more of the set of access points has a motion characteristic that corresponds to movement.

Aspect 13: The computer-implemented method of Aspects 8 to 12, further comprising: determining the one or more of the set of access points that satisfy a candidate criterion, wherein the one or more portions of the service location data include the drop-off or pick-up location of each of the one or more of the set of access points that satisfy the candidate criterion.

Aspect 14. The computer-implemented method of Aspects 8 to 13, wherein the candidate criterion is associated with a predetermined distance threshold, the predetermined distance threshold specifies a maximum distance from an access point to a current location of a computing device.

Aspect 15: A tangible, non-transitory computer readable medium storing instructions that, when executed by at least one processor, cause the at least one processor to perform operations comprising: obtaining sensor data of one or more autonomous vehicles (AV); identifying a building based on the sensor data; identifying a set of access points of the building based on sensor data associated with the building; generating service location data, the service location data identifying, for each of the set of access points, a drop-off or pick-up location; and transmitting one or more portions of the service location data to a service application executed by a computing device operated by a user, the service application implements operations that generate a graphical user interface (GUI) including a graphical element for the drop-off or pick-up location of each of the set of access points.

Aspect 16: The tangible, non-transitory computer readable medium of Aspect 15, wherein the at least one processor performs operations further comprising: receiving, from the service application, location data identifying a current location of the computing device; determining the current location of the computing device is associated with the building; generating application data including the one or more portions of the service location data based on the location data and the service location data; and transmitting the application data to the service application, wherein the service application utilizes the application data to generate the GUI.

Aspect 17: The tangible, non-transitory computer readable medium of Aspect 15 or 16, wherein the at least one processor performs operations further comprising: obtaining map data; obtain user input data characterizing at least one of the set of access points; and wherein identifying the set of access points is further based on the map data and the user input data.

Aspect 18: The tangible, non-transitory computer readable medium of Aspects 15 to 17, wherein the GUI includes a graphical element for each of the set of access points.

Aspect 19: The tangible, non-transitory computer readable medium of Aspects 15 to 18, wherein identifying the set of access points of the building includes: detecting, within portions of the sensor data associated with the building, a set of objects; for each of the set of objects, determining one or more access point candidates based on corresponding portions of sensor data; and for each of the one or more access point candidates, determining a motion characteristic based on corresponding portions of sensor data, wherein one or more of the set of access points has a motion characteristic that corresponds to movement.

Aspect 20: The tangible, non-transitory computer readable medium of Aspects 15 to 19, wherein the at least one processor performs operations further comprising: determining the one or more of the set of access points that satisfy a candidate criterion, wherein the one or more portions of the service location data include the drop-off or pick-up location of each of the one or more of the set of access points that satisfy the candidate criterion.

Aspect 21. The tangible, non-transitory computer readable medium of Aspects 15 to 20, wherein the candidate criterion is associated with a predetermined distance threshold, the predetermined distance threshold specifies a maximum distance from an access point to a current location of a computing device.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A computing system comprising:

a communications interface;

a memory storing instructions; and at least one processor coupled to the communications interface and the memory, the at least one processor being configured to execute the instructions to:

obtain sensor data of one or more autonomous vehicles (AVs);

identify a building based on the sensor data;

obtain weather data associated with a location of the building;

identify a set of access points of the building based on the sensor data associated with the building and the weather data, wherein identifying the set of access points based on the weather data comprises identifying, for each respective access point of the set of access points, a physical structure that provides protection from weather based on a portion of the sensor data associated with the respective access point;

generate service location data, the service location data identifying, for each of the set of access points, a drop-off or pick-up location;

transmit one or more portions of the service location data to a service application executed by a computing device operated by a user, the service application implementing operations that generate a graphical user interface (GUI) including a graphical element for the drop-off or pick-up location of each of the set of access points, and route the one or more AVs to the drop-off or pick-up location associated with one of the access points from the set of access points.

2. The computing system of claim 1, wherein the at least one processor is further configured to:

receive, from the service application, location data identifying a current location of the computing device;

determine that the current location of the computing device is associated with the building;

generate application data including the one or more portions of the service location data based on the location data and the service location data; and transmit the application data to the service application, wherein the service application utilizes the application data to generate the GUI.

3. The computing system of claim 1, wherein the at least one processor is further configured to:

obtain map data;

obtain user input data characterizing at least one access point of the set of access points; and wherein identifying the set of access points is further based on the map data and the user input data.

4. The computing system of claim 1, wherein the GUI includes a graphical element for each of the set of access points.

5. The computing system of claim 1, wherein to identify the set of access points of the building, the at least one processor is further configured to:
- detect, within portions of the sensor data associated with the building, a set of objects;
- for each of the set of objects, determine one or more access point candidates based on corresponding portions of the sensor data; and
- for each of the one or more access point candidates, determine a motion characteristic based on corresponding portions of the sensor data, wherein at least one access point of the set of access points has a motion characteristic that corresponds to movement.

6. The computing system of claim 1, wherein the at least one processor is further configured to determine at least one access point of the set of access points that satisfies a candidate criterion, wherein the one or more portions of the service location data include the drop-off or pick-up location of each of the at least one access point of the set of access points that satisfies the candidate criterion.

7. The computing system of claim 6, wherein the candidate criterion is associated with a predetermined distance threshold, and wherein the predetermined distance threshold specifies a maximum distance from an access point to a current location of the computing device.

8. A computer-implemented method comprising:
- obtaining sensor data of one or more autonomous vehicles (AVs);
- identifying a building based on the sensor data;
- obtaining weather data associated with a location of the building;
- identifying a set of access points of the building based on the sensor data associated with the building and the weather data, wherein identifying the set of access points based on the weather data comprises identifying, for each respective access point of the set of access points, a physical structure that provides protection from weather based on a portion of the sensor data associated with the respective access point;
- generating service location data, the service location data identifying, for each of the set of access points, a drop-off or pick-up location;
- transmitting one or more portions of the service location data to a service application executed by a computing device operated by a user, the service application implementing operations that generate a graphical user interface (GUI) including a graphical element for the drop-off or pick-up location of each of the set of access points; and
- routing the one or more AVs to the drop-off or pick-up location associated with one of the access points from the set of access points.

9. The computer-implemented method of claim 8, further comprising:
- receiving, from the service application, location data identifying a current location of the computing device;
- determining that the current location of the computing device is associated with the building;
- generating application data including the one or more portions of the service location data based on the location data and the service location data; and
- transmitting the application data to the service application, wherein the service application utilizes the application data to generate the GUI.

10. The computer-implemented method of claim 8, further comprising:
- obtaining map data;
- obtaining user input data characterizing at least one access point of the set of access points; and
- wherein identifying the set of access points is further based on the map data and the user input data.

11. The computer-implemented method of claim 8, wherein the GUI includes a graphical element for each of the set of access points.

12. The computer-implemented method of claim 8, wherein identifying the set of access points of the building includes:
- detecting, within portions of the sensor data associated with the building, a set of objects;
- for each of the set of objects, determining one or more access point candidates based on corresponding portions of the sensor data; and
- for each of the one or more access point candidates, determining a motion characteristic based on corresponding portions of the sensor data, wherein at least one access point of the set of access points has a motion characteristic that corresponds to movement.

13. The computer-implemented method of claim 8, further comprising determining at least one access point of the set of access points that satisfies a candidate criterion, wherein the one or more portions of the service location data include the drop-off or pick-up location of each of the at least one access point of the set of access points that satisfies the candidate criterion.

14. The computer-implemented method of claim 13, wherein the candidate criterion is associated with a predetermined distance threshold, and wherein the predetermined distance threshold specifies a maximum distance from an access point to a current location of the computing device.

15. A tangible, non-transitory computer readable medium storing instructions that, when executed by at least one processor, cause the at least one processor to perform operations comprising:
- obtaining sensor data of one or more autonomous vehicles (AVs);
- identifying a building based on the sensor data;
- obtaining weather data associated with a location of the building;
- identifying a set of access points of the building based on the sensor data associated with the building and the weather data, wherein identifying the set of access points based on the weather data comprises identifying, for each respective access point of the set of access points, a physical structure that provides protection from weather based on a portion of the sensor data associated with the respective access point;
- generating service location data, the service location data identifying, for each of the set of access points, a drop-off or pick-up location;
- transmitting one or more portions of the service location data to a service application executed by a computing device operated by a user, the service application implementing operations that generate a graphical user interface (GUI) including a graphical element for the drop-off or pick-up location of each of the set of access points; and
- routing the one or more AVs to the drop-off or pick-up location associated with one of the access points from the set of access points.

16. The tangible, non-transitory computer readable medium of claim 15, wherein the at least one processor further performs operations comprising:

receiving, from the service application, location data identifying a current location of the computing device;

determining that the current location of the computing device is associated with the building;

generating application data including the one or more portions of the service location data based on the location data and the service location data; and transmitting the application data to the service application, wherein the service application utilizes the application data to generate the GUI.

17. The tangible, non-transitory computer readable medium of claim 15, wherein the at least one processor further performs operations comprising:

obtaining map data;

obtaining user input data characterizing at least one access point of the set of access points; and wherein identifying the set of access points is further based on the map data and the user input data.

18. The tangible, non-transitory computer readable medium of claim 15, wherein the GUI includes a graphical element for each of the set of access points.

19. The tangible, non-transitory computer readable medium of claim 15, wherein identifying the set of access points of the building includes:

detecting, within portions of the sensor data associated with the building, a set of objects;

for each of the set of objects, determining one or more access point candidates based on corresponding portions of the sensor data; and for each of the one or more access point candidates, determining a motion characteristic based on corresponding portions of the sensor data, wherein at least one access point of the set of access points has a motion characteristic that corresponds to movement.

20. The tangible, non-transitory computer readable medium of claim 15, wherein the at least one processor further performs operations comprising determining at least one access point of the set of access points that satisfies a candidate criterion, wherein the one or more portions of the service location data include the drop-off or pick-up location of each of the at least one access point of the set of access points that satisfies the candidate criterion.

* * * * *